US012382131B2

(12) United States Patent
Cordray et al.

(10) Patent No.: US 12,382,131 B2
(45) Date of Patent: Aug. 5, 2025

(54) SYSTEMS AND METHODS FOR EPISODE TRACKING IN AN INTERACTIVE MEDIA ENVIRONMENT

(71) Applicant: Adeia Guides Inc., San Jose, CA (US)

(72) Inventors: Charles Cordray, Leawood, KS (US); Todd A. Walker, Bixby, OK (US); Samir B. Armaly, La Canada Flintridge, CA (US)

(73) Assignee: ADEIA GUIDES INC., San Jose, CA (US)

(*) Notice: Subject to any disclaimer, the term of this patent is extended or adjusted under 35 U.S.C. 154(b) by 823 days.

(21) Appl. No.: 17/144,466

(22) Filed: Jan. 8, 2021

(65) Prior Publication Data
US 2021/0211767 A1 Jul. 8, 2021

Related U.S. Application Data

(63) Continuation of application No. 16/196,647, filed on Nov. 20, 2018, now Pat. No. 10,917,689, which is a
(Continued)

(51) Int. Cl.
H04N 21/442 (2011.01)
G06F 3/0482 (2013.01)
(Continued)

(52) U.S. Cl.
CPC ..... *H04N 21/44204* (2013.01); *G06F 3/0482* (2013.01); *H04N 5/782* (2013.01);
(Continued)

(58) Field of Classification Search
CPC ............ H04N 21/44224; H04N 5/782; H04N 7/17318; H04N 21/235; H04N 21/25891;
(Continued)

(56) References Cited

U.S. PATENT DOCUMENTS 6,209,028 B1 * 3/2001 Walker ............ H04N 21/23113
348/E7.071
7,290,698 B2 11/2007 Poslinski et al.
(Continued)

FOREIGN PATENT DOCUMENTS

EP 3169061 B1 5/2017
EP 3346697 B1 8/2023
(Continued)

OTHER PUBLICATIONS

Jensen, Jens. F., Interactive Television: New Genres, New Format, New Content, Proceedings of the Second Australasian Conference on Interactive Entertainment, Sydeny, Nov. 23-25, 2005, S. 89-96.
(Continued)

Primary Examiner — James R Sheleheda
(74) Attorney, Agent, or Firm — HALEY GUILIANO LLP

(57) ABSTRACT

Systems and methods for monitoring a user's viewing progress of media in a series are provided. The user may setup a media profile containing a list of program series to be monitored. The interactive media monitoring application may track the user's viewing progress of programs in the program series on the user equipment and update the user's media profile. The user may request and watch programs in the series at the user's leisure while peripheral media content may be filtered to be consistent with the user's viewing progress in the series.

20 Claims, 20 Drawing Sheets

Related U.S. Application Data continuation of application No. 15/847,215, filed on Dec. 19, 2017, now Pat. No. 10,165,324, which is a continuation of application No. 15/058,894, filed on Mar. 2, 2016, now Pat. No. 9,955,216, which is a continuation of application No. 14/660,596, filed on Mar. 17, 2015, now Pat. No. 9,860,595, which is a continuation of application No. 11/323,464, filed on Dec. 29, 2005, now Pat. No. 9,015,736.

(51) Int. Cl.
| | |
|---|---|
| H04N 5/782 | (2006.01) |
| H04N 7/173 | (2011.01) |
| H04N 21/235 | (2011.01) |
| H04N 21/258 | (2011.01) |
| H04N 21/262 | (2011.01) |
| H04N 21/422 | (2011.01) |
| H04N 21/431 | (2011.01) |
| H04N 21/435 | (2011.01) |
| H04N 21/45 | (2011.01) |
| H04N 21/458 | (2011.01) |
| H04N 21/472 | (2011.01) |
| H04N 21/475 | (2011.01) |
| H04N 21/482 | (2011.01) |
| H04N 21/84 | (2011.01) |
| H04N 21/858 | (2011.01) |

(52) U.S. Cl.
CPC ....... *H04N 7/17318* (2013.01); *H04N 21/235* (2013.01); *H04N 21/25891* (2013.01); *H04N 21/26283* (2013.01); *H04N 21/42204* (2013.01); *H04N 21/431* (2013.01); *H04N 21/435* (2013.01); *H04N 21/44224* (2020.08); *H04N 21/4532* (2013.01); *H04N 21/4583* (2013.01); *H04N 21/47217* (2013.01); *H04N 21/4751* (2013.01); *H04N 21/4755* (2013.01); *H04N 21/4825* (2013.01); *H04N 21/84* (2013.01); *H04N 21/858* (2013.01)

(58) Field of Classification Search
CPC ....... H04N 21/26283; H04N 21/42204; H04N 21/431; H04N 21/435; H04N 21/4532; H04N 21/4583; H04N 21/47217; H04N 21/4751; H04N 21/4755; H04N 21/4825; H04N 21/84; H04N 21/858; G06F 3/0482
See application file for complete search history.

(56) References Cited

U.S. PATENT DOCUMENTS

| | | | | |
|---|---|---|---|---|
| 8,095,951 B1* | 1/2012 | Kunkel | ............... | H04N 9/8205 725/38 |
| 8,127,329 B1* | 2/2012 | Kunkel | ................... | H04N 5/76 725/39 |
| 8,387,089 B1* | 2/2013 | Kunkel | ............. | H04N 21/4263 725/38 |
| 8,429,686 B2* | 4/2013 | Kunkel | ............... | H04N 21/432 725/38 |
| 8,787,736 B2* | 7/2014 | Kunkel | ................. | H04N 5/782 386/343 |
| 9,015,736 B2* | 4/2015 | Cordray | ............. | H04N 21/4751 725/17 |
| 9,185,332 B2* | 11/2015 | Kunkel | .................... | H04N 5/76 |
| 9,860,595 B2* | 1/2018 | Cordray | ................ | G06F 3/0482 |
| 9,955,216 B2* | 4/2018 | Cordray | .............. | H04N 21/858 |
| 10,165,324 B2* | 12/2018 | Cordray | ............ | H04N 21/26283 |
| 10,181,338 B2 | 1/2019 | Vallone et al. | | |
| 10,917,689 B2* | 2/2021 | Cordray | ........... | H04N 21/26283 |
| 2003/0088613 A1* | 5/2003 | Goldschmidt | ..... | H04N 21/8405 709/202 |
| 2003/0154493 A1* | 8/2003 | Kagle | .................. | H04N 21/458 725/115 |
| 2003/0208763 A1 | 11/2003 | McElhatten et al. | | |
| 2004/0010807 A1* | 1/2004 | Urdang | .................. | H04N 11/00 348/E7.071 |
| 2004/0111756 A1 | 6/2004 | Stuckman et al. | | |
| 2005/0094031 A1 | 5/2005 | Tecot et al. | | |
| 2005/0210518 A1* | 9/2005 | Jeong | .................... | H04N 21/482 725/39 |
| 2006/0075451 A1* | 4/2006 | Gupta | .................... | H04H 20/86 725/135 |
| 2006/0167859 A1* | 7/2006 | Verbeck Sibley | ........................ | H04N 21/4532 348/E7.071 |
| 2007/0092204 A1* | 4/2007 | Wagner | ................ | H04N 21/458 386/241 |
| 2007/0124752 A1* | 5/2007 | Sakai | ................. | H04N 21/4722 725/39 |
| 2007/0162951 A1* | 7/2007 | Rashkovskiy | ..... | H04N 21/8166 348/E7.071 |
| 2008/0189753 A1* | 8/2008 | Nesvadba | .......... | H04N 21/8456 725/105 |
| 2009/0052860 A1* | 2/2009 | Derrenberger | ..... | G11B 27/3027 386/281 |
| 2011/0161997 A1* | 6/2011 | Rourk | ................... | H04N 21/812 725/5 |
| 2011/0164861 A1* | 7/2011 | Kunkel | .............. | H04N 21/4263 386/343 |
| 2011/0169913 A1* | 7/2011 | Karaoguz | ................ | G09G 3/20 348/E13.001 |
| 2012/0076473 A1* | 3/2012 | Kunkel | ................ | H04N 21/454 386/297 |
| 2012/0131616 A1* | 5/2012 | Kunkel | ................ | H04N 21/462 725/43 |
| 2013/0198642 A1* | 8/2013 | Carney | .............. | H04N 21/4722 715/738 |
| 2014/0067528 A1* | 3/2014 | Littlejohn | ............... | G06Q 30/02 705/14.49 |
| 2014/0229990 A1* | 8/2014 | Lee | ..................... | H04N 21/6547 725/46 |
| 2018/0025010 A1* | 1/2018 | Ramer | .................. | H04N 21/251 707/727 |
| 2021/0211767 A1* | 7/2021 | Cordray | .......... | H04N 21/25891 |

FOREIGN PATENT DOCUMENTS

| | | |
|---|---|---|
| JP | 2002112186 A | 4/2002 |
| JP | 2004194025 A | 7/2004 |
| WO | 0184340 | 11/2001 |

OTHER PUBLICATIONS

Jensen, Jens F., "Interactive television: new genres, new format, new content", Proceedings of the Second Australasian Conference on Interactive Entertainment, Sydney, Nov. 23-25, 2005, S. 89-96.
Ciden et al., "Technical Paper Archive—Research Reports," IBM Research (Mar. 1955-2020) (3 pages).
Diekmann et al., "Verteilte systeme: State of the Art," Arbeitsbericht Nr. Jan. 2003, Matthias Schumann (ed. Institut für Wirtschaftsinformatik der Georg-August-Universität Göttingen) (with English Translation) (72 pages).
Jensen et al., "Interactive Television: New Genres, New Format, New Content," The Second Australasian Conference on Interactive Entertainment, University of Technology, Australia (Nov. 23-25, 2005) (15 pages).
Lindsay et al., "Research Report—Notes on Distributed Databases," IBM Research Laboratory, San Jose, CA (Jul. 14, 1979) (62 pages).
Selinger, "Replicated Data," Chapter 8, published in Distributed Data Bases—An Advanced Court, Cambridge (1980) (17 pages).

* cited by examiner

SYSTEMS AND METHODS FOR EPISODE TRACKING IN AN INTERACTIVE MEDIA ENVIRONMENT

BACKGROUND OF THE INVENTION

This invention relates to interactive media environments, and more particularly, to interactive media environments that monitor a user's viewing progress.

Interactive media environments allow users to customize a user's media experience using interactive media applications, such as interactive television applications. For example, a user may direct an interactive media application to display program reminders, record media content, search for media content, and enforce parental controls. Interactive media applications, such as interactive television program guides, may also be configured to provide a host of other interactive features, such as television program listings and summaries, pay-per-view (PPV) services, web browsing services, and other interactive features, to the user.

An interactive feature that is becoming increasingly important in interactive media environments is video-on-demand (VOD) services. Using VOD services, a user may be presented with selected media content on-request and at virtually any time specified by the user. VOD services are especially beneficial for users who are unable to view media content when the content is broadcast or otherwise made available to the user equipment. In these instances, a user that subscribes to a VOD service may request the missed content to be delivered or presented at a later time when the user is ready to view or receive the content.

Another important interactive feature available in some interactive media environments is digital video recording (DVR) services. Using DVR services, a user may program an interactive media application to automatically record a show (or series of shows) onto a storage medium or recording device. DVR services, like VOD services, allow a user to be presented with media content at times other than the times when the media content was originally broadcast or made available to the user equipment.

Known interactive media environments, through the use of DVR, VOD, and other similar services, allow a user to become disconnected with the rigid broadcast schedule of media content. Users may then watch the media content at the user's own pace. Some of this media content may be episodic content. Episodic content typically is self-contained within each episode and does not include a common storyline with other episodes of the media content. For example, episodes of the series "Seinfeld" are typically episodic. Viewers may watch one episode without watching all of the previous episodes in the series to understand the story. However, other media content may be serial in nature. Serial programming is any programming containing a temporal component, such as a recommended order of viewing. Serial programming may share themes and/or plot sequences with other episodes in the series. An example of serial programming includes episodes of the television series "24." A user who watches an episode of the television series "24" out of sequence may not recognize or understand certain characters, themes, or plot elements that were introduced in previous, unwatched episodes. This often causes the viewer to be confused or lose interest in the media content. In order to fully comprehend episodes of serial programming, other related programming must typically be watched prior to watching the serial programming.

Known interactive media environments do not track and report a user's progress through a series of related programming, such as a broadcast television series or a set of movie sequels. Known interactive media environments also do not filter other media content (e.g., web, news, and advertising content) that may be presented on the user equipment so that this other content is consistent with the user's media viewing progress. For example, a user, who is watching a particular episode of a certain television series, may not wish to see spoilers or other irrelevant media content related to unwatched shows in a series of related programs.

In view of the foregoing, it would be desirable to provide systems and methods for monitoring a user's viewing progress of a user-selected series of related programs. It would also be desirable to use such monitoring techniques to provide a media environment that is consistent with the user's viewing progress.

SUMMARY OF THE INVENTION

In accordance with the principles of the present invention, systems and methods for an interactive media monitoring application are provided. The interactive media monitoring application monitors a user's viewing progress of user-selected series of programs or media.

The interactive media monitoring application may create and maintain a user media profile that tracks a user's viewing progress as the user advances through a series of related programming or a collection of media content. In some embodiments, the interactive media monitoring application may also access a set of replacement media content for substitution with media content about to be presented on the user equipment. If the media monitoring application determines that content about to be presented on the user equipment is inconsistent with the user's media profile, the media monitoring application may remove or replace the inconsistent media content.

In some embodiments, the interactive media monitoring application may use a dynamic filter to analyze incoming media content in real-time. In these environments, media content that the filter determines to be inconsistent with a user's viewing progress may be automatically removed or substituted with alternate content so as to be consistent with the user's current viewing progress.

In some embodiments, the interactive media monitoring application may maintain separate media profiles for each user accessing the user equipment. In these embodiments, each user's viewing progress may be individually monitored. The media monitoring application may then present a consistent media environment based on each user's individual media viewing progress. In some of these embodiments, a user's media profile may be portable to any user equipment in the interactive media system.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE PREFERRED EMBODIMENTS

Figure 1:
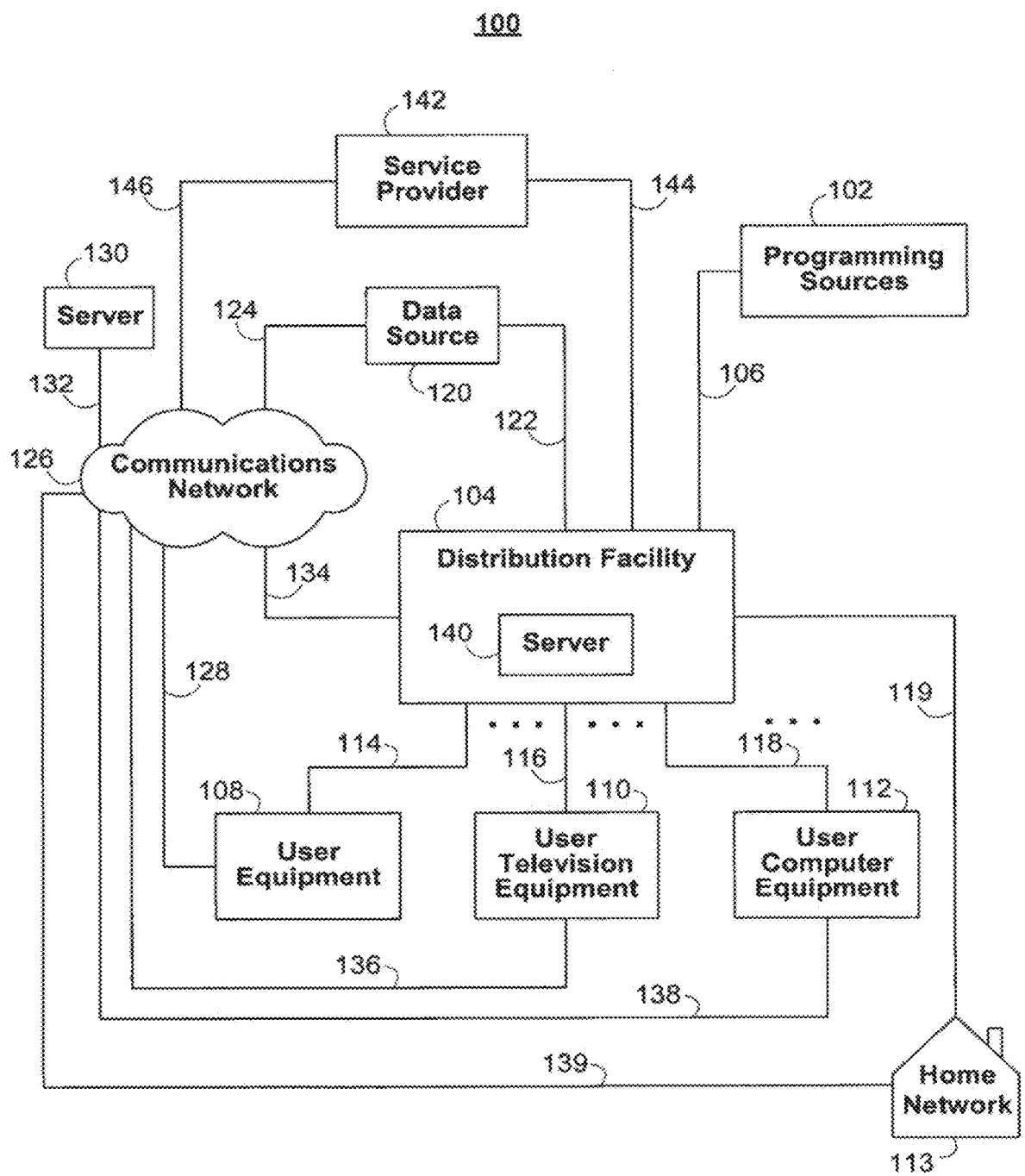
FIG. 1 is a diagram of an illustrative interactive media system in accordance with one embodiment of the invention.

The amount of media available to users in any given media delivery system can be substantial. Consequently, many users desire a form of media guidance, an interface that allows users to efficiently navigate media selections and easily identify media that they may desire. An application which provides such guidance is referred to herein as an interactive media guidance application or, sometimes, a guidance application.

Interactive media guidance applications may take various forms depending on the media for which they provide guidance. One typical type of media guidance application is an interactive television program guide. Interactive television program guides are well-known guidance applications that, among other things, allow users to navigate among and locate television programming viewing choices and, in some systems, digital music. The television programming (and music programming) may be provided via traditional broadcast, cable, satellite, the Internet, or other delivery schemes. The programming may be provided on a subscription basis (sometimes referred to as premium programming), as pay-per-view programs, or on-demand such as in video-on-demand (VOD) systems.

With the advent of the Internet, mobile computing, and high-speed wireless networks, users are able to access media on personal computers (PCs) and devices on which they traditionally could not. Non-television-centric platforms (i.e., platforms that distribute media with equipment not part of the user's broadcast, cable or satellite television-delivery network) allow users to navigate among and locate desirable video clips, full motion videos (which may include television programs), images, music files, and other suitable media. Consequently, media guidance is also necessary on modern non-television-centric platforms. For example, media guidance applications may be provided as on-line applications (i.e., provided on a web-site), or as stand-alone applications or clients on hand-held computers, personal digital assistants (PDAs) or cellular telephones. In some systems, users may control equipment remotely via a media guidance application. For example, users may access an online media guide and set recordings or other settings on their in home equipment. This may be accomplished by the on-line guide controlling the user's equipment directly or via another media guide that runs on the user's equipment. Systems for remote recording of media content are described in more detail in Ellis et al. U.S. Patent Application Publication Nos. 20030149988 and 20050229213, both of which are hereby incorporated by reference herein in their entireties.

An interactive media monitoring application may track a user's viewing progress through a series of related programs, such as a broadcast television series made available via a VOD or DVR service. The interactive media monitoring application may be a stand-alone application or be integrated with an existing interactive media guidance application, such as an interactive television program guide. The interactive media monitoring application may use guidance application data, such as program schedule and content data, as well as other data associated with media content in the media delivery system to filter media content and other information (e.g., web or Internet data) so that this content and information is consistent with the user's viewing progress.

An illustrative interactive media system 100 in accordance with the present invention is shown in FIG. 1. System 100 is intended to illustrate a number of approaches by which media of various types, and guidance for such media, may be provided to (and accessed by) end-users. The present invention, however, may be applied in systems employing any one or a subset of these approaches, or in systems employing other approaches for delivering media and providing media guidance.

The first approach represents a typical television-centric system in which users may access television (and in some systems music) programming. This includes programming sources 102 and distribution facility 104. Media such as television programming and digital music is provided from programming sources 102 to distribution facility 104, using communications path 106. Communications path 106 may be a satellite path, a fiber-optic path, a cable path, or any other suitable wired or wireless communications path or combination of such paths.

Programming sources 102 may be any suitable sources of television and music programming, such as television broadcasters (e.g., NBC, ABC, and HBO) or other television or music production studios. Programming sources 102 may provide television programming in a variety of formats in high definition and standard definition, such as, for example, 1080p, 1080i, 720p, 480p, 480i, and any other suitable format.

Distribution facility 104 may be a cable system headend, a satellite television distribution facility, a television broadcaster, or any other suitable facility for distributing video media (e.g., television programs, video-on-demand programs, pay-per-view programs) and audio media (e.g., music programming and music clips) to the equipment of users. In some approaches, distribution facility 104 may also distribute other media to users, such as video and audio clips, web pages, and interactive applications, that may be offered to subscribers of a given cable or satellite system. There are typically numerous television distribution facilities 104 in system 100, but only one is shown in FIG. 1 to avoid overcomplicating the drawing.

Distribution facility 104 may be connected to various user equipment devices 108, 110, and 112. Such user equipment devices may be located, for example, in the homes of users. User equipment devices may include user television equipment 110, user computer equipment 112, or any other type of user equipment suitable for accessing media. User equipment 108 may be any type of user equipment (e.g., user television equipment, user computer equipment, etc.) and, for simplicity, user equipment devices may be referred to generally as user equipment 108.

User equipment devices 108, 110, and 112 may receive media (such as television, music, web pages, etc.) and other data from distribution facility 104 over communications paths, such as communications paths 114, 116, and 118, respectively. User equipment devices 108, 110, 112 may also transmit signals to distribution facility 104 over paths 114, 116, and 118, respectively. Paths 114, 116, and 118 may be cables or other wired connections, free-space connections (e.g., for broadcast or other wireless signals), satellite links, or any other suitable link or combination of links.

A second approach illustrated in FIG. 1 by which media and media guidance are provided to end users is a non-television-centric approach. In this approach media such as video (which may include television programming), audio, images, web pages, or a suitable combination thereof, are provided to equipment of a plurality of users (e.g., user equipment 108, user television equipment 110, and user computer equipment 112) by server 130 via communications network 126. This approach is non-television-centric because media is provided by and delivered at least partially, and sometimes exclusively, via equipment that is not part of users' traditional broadcast, cable or satellite television delivery systems. In non-television-centric approaches, television programming may be only one type of media that is provided (if at all).

In some embodiments for this approach, communications network 126 is the Internet. Server 130 may provide for example, a web site that is accessible to the user's equipment and provides an on-line guidance application for the user. In such approaches, the user's equipment may be, for example, a PC or a hand-held device such as a PDA or web-enabled cellular telephone that incorporates a web browser. In other embodiments, server 130 uses the Internet as a transmission medium but does not use the Web. In such approaches, the user's equipment may run a client application that enables the user to access media. In still other approaches, communications network 126 is a private communications network, such as a cellular phone network, that does not include the Internet.

In yet other approaches, communications network 126 includes a private communications network and the Internet. For example, a cellular telephone or other mobile-device service provider may provide Internet access to its subscribers via a private communications network, or may provide media such as video clips or television programs to its subscribers via the Internet and its own network.

The aforementioned approaches for providing media may, in some embodiments, be combined. For example, a distribution facility 104 may provide a television-centric media delivery system, while also providing users' equipment (e.g., 108, 110 and 112) with access to other non-television-centric delivery systems provided by server 130. For example, a user's equipment may include a web-enabled set-top box or a television enabled PC. Distribution facility 104 may, in addition to television and music programming, provide the user with Internet access whereby the user may access server 130 via communications network 126. Distribution facility 104 may communicate with communications network 126 over any suitable path 134, such as a wired path, a cable path, fiber-optic path, satellite path, or combination of such paths.

Media guidance and monitoring applications may be provided using any approach suitable for the type of media and distribution system for which the applications are used. Media guidance and monitoring applications may be, for example, stand alone applications implemented on users' equipment. In other embodiments, media guidance and monitoring applications may be client-server applications where only the client resides on the users' equipment. In still other embodiments, guidance and monitoring applications may be provided as web sites accessed by a browser implemented on the users' equipment. Whatever the chosen implementation, the media guidance and/or media monitoring application will require information about the media for which it is providing guidance or monitoring. For example, titles or names of media, brief descriptions, schedule information, or other information may be necessary to allow users to navigate among, find, and track the viewing progress of desired media selections.

In some television-centric embodiments, for example, the guidance application may be a stand-alone interactive television program guide that receives program guide data via a data feed (e.g., a continuous feed, trickle feed, or data in the vertical blanking interval of a channel). Data source 120 in system 100 may include a program listings database that is used to provide the user with television program-related information such as scheduled broadcast times, titles, channels, ratings information (e.g., parental ratings and critic's ratings), detailed title descriptions, genre or category information (e.g., sports, news, movies, etc.), program format (e.g., standard definition, high definition) and information on actors and actresses. Data source 120 may also contain media content attribute flags and other data associated with programs, such as program number, episode number, and season information for programs that are part of program series. Data source 120 may also be used to provide advertisements (e.g., program guide advertisements and advertisements for other interactive television applications), real-time data such as sports scores, stock quotes, news data, and weather data, application data for one or more media guidance applications or other interactive applications, and any other suitable data for use by system 100. As another example, data source 120 may provide data indicating the types of information that may be included in interactive media guidance overlays (e.g., at the request of the user, absent user modification, etc.).

Program guide data may be provided to user equipment, including user equipment located on home network 113, using any suitable approach. For example, the data may be transmitted to the user equipment as a broadcast, multicast, unicast, or any other suitable transmission stream. Program schedule data and other data may be provided to the user equipment on a television channel sideband, in the vertical blanking interval of a television channel, using an in-band digital signal, using an out-of-band digital signal, or by any other suitable data transmission technique. Program schedule data and other data may be provided to user equipment on multiple analog or digital television channels. Program schedule data and other data may be provided to the user equipment with any suitable frequency (e.g., continuously, daily, in response to a request from user equipment, etc.).

In some television-centric embodiments, guidance data from data source 120 may be provided to users' equipment using a client-server approach. For example, a guidance application client residing on the user's equipment may initiate sessions with server 140 to obtain guidance data when needed.

There may be multiple data sources (such as data source 120) in system 100, although only one data source is shown in FIG. 1 to avoid overcomplicating the drawing. For example, a separate data source may be associated with each of a plurality of television broadcasters and may provide data that is specific to those broadcasters (e.g., advertisements for future programming of the broadcasters, logo data for displaying broadcasters' logos in program guide display screens, etc.). Data source 120 and any other system components of FIG. 1 may be provided using equipment at one or more locations. Systems components are drawn as single boxes in FIG. 1 to avoid overcomplicating the drawings.

Data source 120 may provide data to distribution facility 104 over communications path 122 for distribution to the associated user equipment and home network 113 (discussed below) over paths 114, 116, 118, and 119 (e.g., when data source 120 is located at a main facility). Communications path 122 may be any suitable communications path such as a satellite communications path or other wireless path, a fiber-optic or other wired communications path, a path that supports Internet communications, or other suitable path or combination of such paths.

In some television-centric and non-television centric approaches, data source 120 may provide guidance data directly to user equipment 108 over path 124, communications network 126, and path 128 (e.g., when data source 120 is located at a facility such as one of programming sources 102). In some embodiments of the present invention, data source 120 may provide guidance data directly to user equipment located on home network 113 (discussed below) over path 124, communications network 126, and path 139 (e.g., when data source 120 is located at a facility such as one of programming sources 102). Paths 124, 128, and 139 may be wired paths such as telephone lines, cable paths, fiber-optic paths, satellite paths, wireless paths, any other suitable paths or a combination of such paths. Communications network 126 may be any suitable communications network, such as the Internet, the public switched telephone network, or a packet-based network.

User equipment devices, including user equipment devices located on home network 113 (discussed below), such as user television equipment and personal computers, may use the program schedule data and other interactive media guidance application data to display program listings and other information (e.g., information on digital music) for the user. An interactive television program guide application or other suitable interactive media guidance application may be used to display the information on the user's display (e.g., in one or more overlays that are displayed on top of video for a given television channel). Interactive displays may be generated and displayed for the user using any suitable approach. In one suitable approach, distribution facility 104, server 130, or another facility, may generate application display screens and may transmit the display screens to user equipment for display. In another suitable approach, user equipment may store data for use in one or more interactive displays (e.g., program schedule data, advertisements, logos, etc.), and an interactive media guidance application implemented at least partially on the user equipment may generate the interactive displays based on instructions received from distribution facility 104, server 130 or another facility. In some embodiments of the present invention, user equipment may store only the data that is used to generate the interactive television displays (e.g., storing logo data for a particular television broadcaster only if the logo is to be included in one or more interactive television displays). In some embodiments of the present invention, user equipment may store data that is not necessarily used to generate the interactive television displays (e.g., storing advertisements associated with a particular television broadcaster that may or may not be displayed depending on, for example, the outcome of negotiations with the television broadcaster). Any other suitable approach or combination of approaches may be used to generate and display interactive overlays for the user.

In still other embodiments, interactive media guidance applications (television-centric and non-television centric) may be provided online as, for example, websites. For example, server 130 may provide an online interactive television program guide. As another example, user equipment 108 may be a mobile device, such as a cellular telephone or personal digital assistant (PDA). The mobile device may be web-enabled to allow the user to access an on-line guidance application (which may be modified from its original version to make it appropriate for a cellular phone). Alternatively, the mobile device may have an applet that communicates with server 130 to obtain guidance data via the Internet.

Server 130 may receive program schedule data and other data from data source 120 via communications path 124, communications network 126, and communications path 132 or via another suitable path or combination of paths. Path 132 may be a satellite path, fiber-optic path, wired path, or any other path or combination of paths. User equipment 108 may access the on-line interactive media guidance application and other sources from server 130 via communications path 128. User equipment 108 may also access the application and other services on server 130 via communications path 114, distribution facility 104, and communications path 134. For example, a cable modem or other suitable equipment may be used by user equipment 108 to communicate with distribution facility 104.

User equipment such as user television equipment 110, user computer equipment 112, and user equipment located on home network 113 may access the on-line interactive media guidance application and server 130 using similar arrangements. User television equipment 110 may access the on-line interactive media guidance application and server 130 using communications path 136 or using path 116, distribution facility 104, and path 134. User computer equipment 112 may access the on-line interactive media guidance application and server 130 using communications path 138 or using path 118, distribution facility 104, and path 134. User equipment located on home network 113 may access the on-line media guidance application and server 130 using communications path 139 or using path 119, distribution facility 104, and path 134. Paths 136, 138, and 139 may be any suitable paths such as wired paths, cable paths, fiber-optic paths, wireless paths, satellite paths, or a combination of such paths.

An interactive media monitoring application implemented at least partially on user equipment 108, user television equipment 110, user computer equipment 112, distribution facility 104, or another device of media system 100 may use program schedule data and other interactive media application data to monitor a user's viewing progress of media content on the user equipment. The user's viewing progress may be tracked and recorded in user media profiles, which may be stored locally on the user equipment or on a network device (e.g., server 130 and/or server 140) within media system 100. The media monitoring application may also filter media content and other information (e.g., web or Internet data) that is inconsistent with the user's viewing progress. For example, a spoiler advertisement relating to an unwatched program may be replaced with an advertisement relating to an already watched program. For the sake of simplicity, media content that is inconsistent with a user's media profile (and hence the user's viewing progress) will be referred to herein as inconsistent media content. This content may include advertising, news segment, web content, or any other media content available in media system 100.

In some embodiments, system 100 may support other interactive applications in addition to the interactive media guidance and media monitoring applications. Such applications may be implemented using any suitable approach. For example, the interactive applications may be implemented locally on the user equipment or in a distributed fashion (e.g., using a client-server architecture in which the user equipment serves at least partly, and for at least some of the time, as the client and a server, such as server 140 at distribution facility 104, server 130, or other suitable equipment acts as the server). Other distributed architectures may also be used if desired. Moreover, some or all of the features of the interactive applications of system 100 (including the media guidance application and media monitoring application) may be provided using operating system software or middleware software. Such operating system software and middleware may be used instead of or in combination with application-level software. In yet other approaches, interactive applications may also be supported by servers or other suitable equipment at one or more service providers such as service provider 142. Regardless of the particular arrangement used, the software that supports these features may be referred to as an application or applications.

For example, an interactive application such as a home shopping service may be supported by a service provider such as service provider 142 that has sales representatives, order fulfillment facilities, account maintenance facilities, and other equipment for supporting interactive home shopping features. A home shopping application that is implemented using the user equipment may be used to access the service provider to provide such features to the user. The user equipment may access service provider 142 via distribution facility 104 and communications path 144 or via communications network 126 and communications path 146. Communications paths such as paths 144 and 146 may be any suitable paths such as wired paths, cable paths, fiber-optic paths, satellite paths, or a combination of such paths.

Another example of an interactive application is a home banking application. A home banking service may be supported using personnel at facilities such as service provider 142. An interactive home banking application that is implemented using the user equipment may access the home banking service via distribution facility 104 and communications path 144 or via communications network 126 and communications path 146.

If desired, an interactive media guidance application such as a network-based video recorder or a video-on-demand application may be supported using server 140, server 130, or equipment at service provider 142. Video-on-demand content and video recorded using a network-based video recorder arrangement may be stored on server 140 or server 130 or at service provider 142 and may be provided to the user equipment when requested by users. An interactive television program guide, for example, may be used to support the functions of a personal video recorder (sometimes called a digital video recorder) that is implemented using user equipment 108. Illustrative equipment that may be used to support personal video recorder functions include specialized personal video recorder devices, integrated receiver decoders (IRDs), set-top boxes with integrated or external hard drives, or personal computers with video recording capabilities.

Interactive applications such as media guidance applications (e.g., interactive television program guide applications and video-on-demand applications), home shopping applications, home banking applications, game applications, and other applications (e.g., applications related to e-mail and chat or other communications functions, etc.) may be provided as separate applications that are accessed through a navigation shell application (i.e., a menu application with menu options corresponding to the applications). The features of such applications may be combined. For example, games, video-on-demand services, home shopping services, network-based video recorder functions, personal video recorder functions, navigational functions, program guide functions, communications functions, and other suitable functions may be provided using one application or any other suitable number of applications. The one or more applications may display various overlays on user equipment including, for example, interactive television information on top of video for a given television channel.

Interactive television program guide applications, home banking applications, home shopping applications, network-based video recorder and personal video recorder applications, video-on-demand applications, gaming applications, communications applications, and navigational applications are only a few illustrative examples of the types of interactive media guidance and other applications that may be supported by system 100. Other suitable interactive applications that may be supported include news services, web browsing and other Internet services, and interactive wagering services (e.g., for wagering on horse races, sporting events, and the like). Interactive television overlays that are displayed by these applications may also be customized in accordance with the present invention.

Users may have multiple types of user equipment by which they access media and obtain media guidance. For example, some users may have home networks that are accessed by in-home and mobile devices. As shown in FIG. 1, home network 113 communicates with distribution facility 104 and server 130 over paths 119 and 139 (and, in the case of server 130, communications network 126). Such home networks 113 may be located, for example, in homes of users or distributed, for example, among homes of users. Home networks 113 may each include a plurality of interconnected user equipment devices, such as, for example user equipment devices 108, 110 and 112. In some embodiments, users may control in-home devices via a media guidance application implemented on a remote device. For example, users may access an online media guidance application on a website via a personal computer at their office, or a mobile device such as a PDA or web-enabled cellular telephone. The user may set settings (e.g., recordings, reminders, or other settings) on the on-line guidance application to control the user's in-home equipment. The on-line guide may control the user's equipment directly, or by communicating with a media guidance application on the user's in-home equipment.

Figure 2:
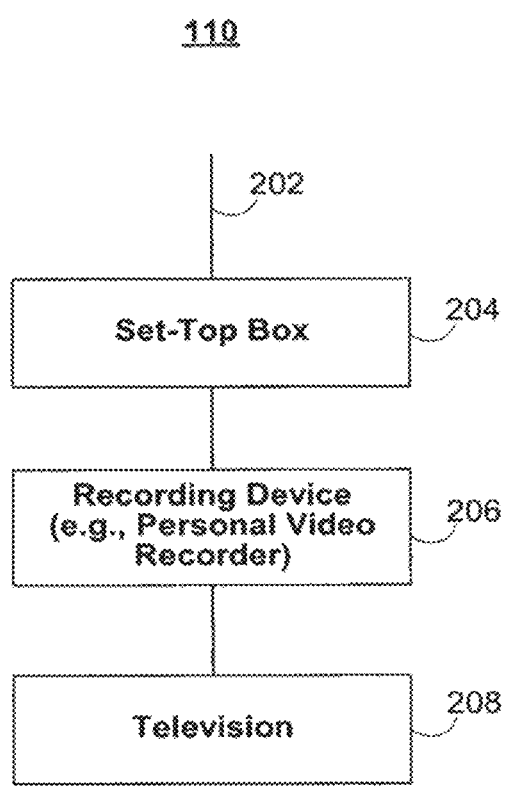
FIG. 2 is a diagram of the illustrative user equipment of FIG. 1 based on a set-top box arrangement in accordance with one embodiment of the invention.

FIGS. 2-6 show illustrative arrangements for user equipment. An illustrative set-top box-based arrangement for user equipment 110 is shown in FIG. 2. User television equipment 110 may be stand-alone or a part of home network 113 (FIG. 1). Input/output 202 may be connected to communications paths such as paths 116 and 136 (FIG. 1). Input/output functions may be provided by one or more wires or communications paths, but are shown as a single path in FIG. 2 to avoid overcomplicating the drawing. Television programming, program guide data, and any other suitable interactive media guidance application data or other data may be received using input/output 202. Commands and requests and other data generated as a result of user interactions with the interactive media guidance application may also be transmitted over input/output 202.

Set-top box 204 may be any suitable analog or digital set-top box (e.g., a cable set-top box). Set-top box 204 may contain an analog tuner for tuning to a desired analog television channel (e.g., a channel comprising television programming, interactive television data, or both). Set-top box 204 may also contain digital decoding circuitry for receiving digital television channels (e.g., channels comprising television or music programming, interactive television data, etc.). Set-top box 204 may also contain a high-definition television tuner for receiving and processing high-definition television channels. Analog, digital, and high-definition channels may be handled together if desired. Multiple tuners may be provided (e.g., to handle simultaneous watch and record functions or picture-in-picture (PIP) functions). Box 204 may be an integrated receiver decoder (IRD) that handles satellite television. If desired, box 204 may have circuitry for handling cable, over-the-air broadcast, and satellite content.

Set-top box 204 may be configured to output media, such as television programs, in a preferred format. Because television programs may be received in a variety of formats, set-top box 204 may contain scaler circuitry for upconverting and downconverting television programs into the preferred output format used by set-top box 204. For example, set-top box 204 may be configured to output television programs in 720p. In this example, the scaler circuitry may upconvert standard-definition television programs having 480 lines of vertical resolution to 720p format and downconvert certain high-definition television programs having 1080 lines of vertical resolution to 720p format.

Box 204 may include a storage device (e.g., a digital storage device such as a hard disk drive) for providing recording capabilities. Box 204 may also be connected to a recording device 206 such as a video cassette recorder, personal video recorder, optical disc recorder, or other device or devices with storage capabilities. In some embodiments, box 204 may be configured to record either standard-definition television programs or high-definition television programs. In some embodiments, box 204 may be configured to record both standard-definition television programs and high-definition television programs.

Set-top box 204 contains a processor (e.g., a microcontroller or microprocessor or the like) that is used to execute software applications. Set-top box 204 may contain memory such as random-access memory for use when executing applications. Nonvolatile memory may also be used (e.g., to launch a boot-up routine and other instructions). Hard disk storage in box 204 or in recording device 206 may be used to back up data and to otherwise support larger databases and storage requirements than may be supported using random-access memory approaches. Hard disk storage in box 204 or in recording device 206 may also be used to store and back up program guide settings or saved user preferences.

Set-top box 204 may have infrared (IR) or other communications circuitry for communicating with a remote control or wireless keyboard. Set-top box 204 may also have dedicated buttons and a front-panel display. The front-panel display may, for example, be used to display the current channel to which the set-top box is tuned.

Set-top box 204 may also have communications circuitry such as a cable modem, an integrated services digital network (ISDN) modem, a digital subscriber line (DSL) modem, a telephone modem, or a wireless modem for communications with other equipment. Such communications may involve the Internet or any other suitable communications networks or paths. If desired, the components of set-top box 204 may be integrated into other user equipment (e.g., a television or videocassette recorder).

Recording device 206 may be used to record videos provided by set-top box 204. For example, if set-top box 204 is tuned to a given television channel, the video signal for that television channel may be passed to recording device 206 for recording on a videocassette, compact disc, digital video disk, or internal hard drive or other storage device. In some embodiments, recording device 206 may be configured to record either standard-definition television programs or high-definition television programs. In some embodiments, recording device 206 may be configured to record both standard-definition television programs and high-definition television programs. Recording device 206 may have communications circuitry such as a cable modem, an ISDN modem, a DSL modem, or a telephone modem for communications with other equipment. Such communications may involve the Internet or any other suitable communications networks or paths. The components of recording device 206 may be integrated into other user equipment (e.g., a television, stereo equipment, etc.).

Recording device 206 may be controlled using a remote control or other suitable user interface. If desired, video recorder functions such as start, stop, record and other functions for device 206 may be controlled by set-top box 204. For example, set-top box 204 may control recording device 206 using infrared commands directed toward the remote control inputs of recording device 206 or set-top box 204 may control recording device 206 using other wired or wireless communications paths between box 204 and device 206.

The output of recording device 206 may be provided to television 208 for display to the user. In some embodiments, television 208 may be capable of displaying high-definition programming (i.e., HDTV-capable). If desired, multiple recording devices 206 or no recording device 206 may be used. If recording device 206 is not present or is not being actively used, the video signals from set-top box 204 may be provided directly to television 208. Any suitable television or monitor may be used to display the video. For example, if the video is in a high-definition format, an HDTV-capable television or monitor is required to display the video. In the equipment of FIG. 2 and the other equipment of system 100 (FIG. 1), the audio associated with various video items is typically distributed with those video items and is generally played back to the user as the videos are played. In some embodiments, the audio may be distributed to a receiver (not shown), which processes and outputs the audio via external speakers (not shown).

Figure 3:
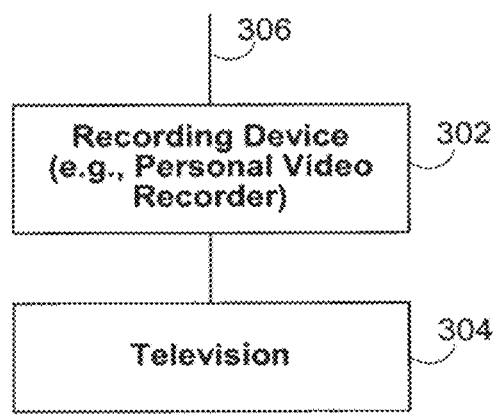
FIG. 3 is a diagram of an illustrative arrangement for the user television equipment of FIG. 1 in accordance with one embodiment of the invention.

Another illustrative arrangement for user television equipment 110 (FIG. 1) is shown in FIG. 3. User television equipment 110 may be stand-alone or a part of home network 113 (FIG. 1). In the example of FIG. 3, user television equipment 110 includes a recording device 302 such as a digital video recorder (e.g., a personal video recorder (PVR)) that uses a hard disk or other storage for recording video. Recording device 302 may alternatively be a digital video disc recorder, compact disc recorder, videocassette recorder, or other suitable recording device. Equipment 110 of FIG. 3 may also include a television 304. In some embodiments, television 304 may be HDTV-capable. Input/output 306 may be connected to communications paths such as paths 116 and 136 (FIG. 1). Television programming, program schedule data, and other data (e.g., advertisement data, data indicating one or more television channels for which the display of an overlay is to be customized, etc.) may be received using input/output 306. Commands and requests and other data from the user may be transmitted over input/output 306.

Recording device 302 may contain at least one analog tuner for tuning to a desired analog television channel (e.g., to display video for a given television channel to a user, to receive program guide data and other data) and multiple other tuners may also be provided. Recording device 302 may also contain digital decoding circuitry for receiving digital television programming, music programming, program guide data, and other data on one or more digital channels. Recording device 302 may also contain circuitry for receiving high-definition television channels. If desired, recording device 302 may contain circuitry for handling analog, digital, and high-definition channels. Recording device 302 also contains a processor (e.g., a microcontroller or microprocessor or the like) that is used to execute software applications. Recording device 302 may contain memory such as random-access memory for use when executing applications. Nonvolatile memory may also be used to store a boot-up routine or other instructions. The hard disk and other storage in recording device 302 may be used to support databases (e.g., program guide databases or other interactive television application databases). The hard disk or other storage in recording device 302 may also be used to record video such as television programs or video-on-demand content or other content provided to recording device 302 over input/output 306.

Recording device 302 may have IR communications circuitry or other suitable communications circuitry for communicating with a remote control. Recording device 302 may also have dedicated buttons and a front-panel display. The front-panel display may, for example, be used to display the current channel to which the recording device is tuned. Recording device 302 may also have communications circuitry such as a cable modem, an ISDN modem, a DSL modem, a telephone modem, or a wireless modem for communications with other equipment. Such communications may involve the Internet or other suitable communications networks or paths.

If desired, recording device 302 may include a satellite receiver or other equipment that has wireless communications circuitry for receiving satellite signals.

Recording device 302 of FIG. 3 or recording device 206 of FIG. 2 may record new video while previously recorded video is being played back on television 304 or 208. This allows users to press a pause button during normal television viewing. When the pause button is pressed, the current television program is stored on the hard disk of digital video recorder 302. When the user presses play, the recorded video may be played back. This arrangement allows the user to seamlessly pause and resume television viewing. Recording devices 302 and 206 may also be used to allow a user to watch a previously-recorded program while simultaneously recording a new program.

The set-top box arrangement of FIG. 2 and the personal video recorder with a built-in set-top box arrangement of FIG. 3 are merely illustrative. Other arrangements may be used if desired. For example, user television equipment may be based on a WebTV box, a personal computer television (PC/TV), or any other suitable television equipment arrangement. If desired, the functions of components such as set-top box 204, recording device 302, a WebTV box, or PC/TV or the like may be integrated into a television or personal computer or other suitable device.

Figure 4:
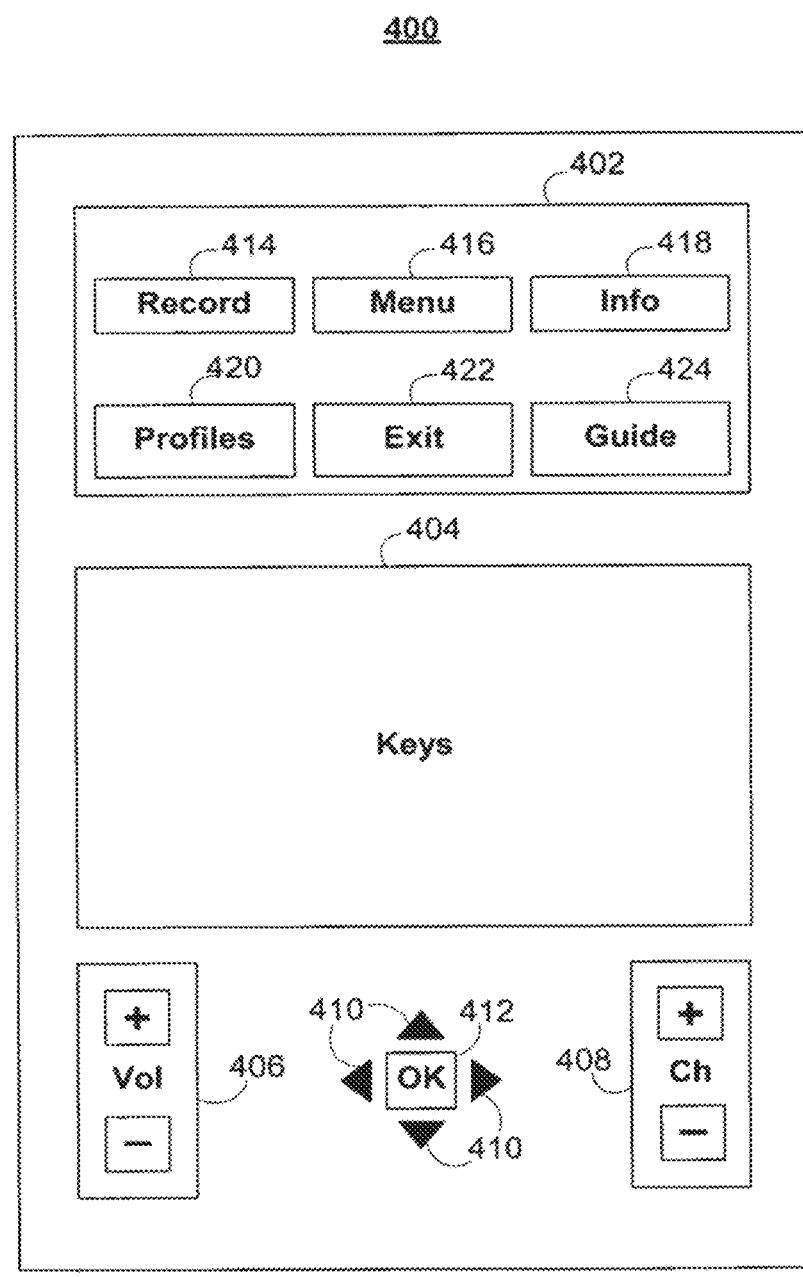
FIG. 4 is a diagram of an illustrative user input device in accordance with one embodiment of the invention.

An illustrative remote control 400 for operating user television equipment 110 (FIG. 1) or suitable user computer equipment 112 is shown in FIG. 4. Remote control 400 is only illustrative and any other suitable user input interface may be used to operate user equipment (e.g., a mouse, trackball, keypad, keyboard, touch screen, voice recognition system, etc.). Remote control 400 may have function keys 402 and other keys 404 such as keypad keys, power on/off keys, pause, stop, fast-forward and reverse keys. Volume up and down keys 406 may be used for adjusting the volume of the audio portion of a video. Channel up and down keys 408 may be used to change television channels and to access content on virtual channels. Cursor keys 410 may be used to navigate on-screen menus. For example, cursor keys 410 may be used to position an on-screen cursor, indicator, or highlight (sometimes all generically referred to herein as a highlight or highlight region) to indicate interest in a particular option or other item on a display screen that is displayed by the interactive television application.

OK key 412 (sometimes called a select or enter key) may be used to select on-screen options that the user has highlighted.

Keys 402 may include RECORD key 414 for initiating recordings. MENU button 416 may be used to direct an interactive media guidance application to display a menu on the user's display screen (e.g., on television 208 or 304 or on a suitable monitor or computer display). INFO button 418 may be used to direct an interactive media guidance application to display an information display screen. For example, when a user presses INFO key 418 while video for a given television channel is displayed for the user, an interactive television program guide may display a FLIP/BROWSE overlay including program schedule information for the current program on the given television channel on top of the video. As another example, when a particular program listing in an interactive television program listings display screen is highlighted, the user pressing INFO button 418 may cause an interactive television program guide to provide additional program information associated with that program listing (e.g., a program description, actor information, schedule information, etc.).

PROFILES button 420 may be used to quickly access the current user's media profile or viewing progress display screen 1200 of FIG. 12 (described below). In some embodiments, PROFILES button 420 may be used to access a list of all media profiles stored on the user equipment. In other embodiments, PROFILES button 420 may access the interactive media monitoring application setup, log-in, or configuration display screens.

EXIT button 422 may be used to exit the interactive media guidance application or to exit a portion of the interactive media guidance application (e.g., to cause an interactive television program guide to remove a FLIP, BROWSE, or other interactive television overlay from the display screen). GUIDE button 424 may be used to invoke an interactive television program guide (e.g., a program guide menu screen, program listings screen, or other program guide screen).

The keys shown in FIG. 4 are merely illustrative. Other keys or buttons may be provided if desired. For example, a music button may be used to access music with the interactive media guidance application. An edit button may be used to edit stored content (e.g., to remove commercials, remove portions of a video, etc.). Alphanumeric buttons may be used to enter alphanumeric characters. A last or back button may be used to browse backward in the interactive media guidance application (e.g., to return to a previous channel, web page, or other display screen). Video recorder function buttons such as a play button, pause button, stop button, rewind button, fast-forward button, and record button, may be used to control video recorder functions (local or network-based) in system 100 (FIG. 1). A help key may be used to invoke help functions such as context-sensitive on-screen help functions.

Figure 5:
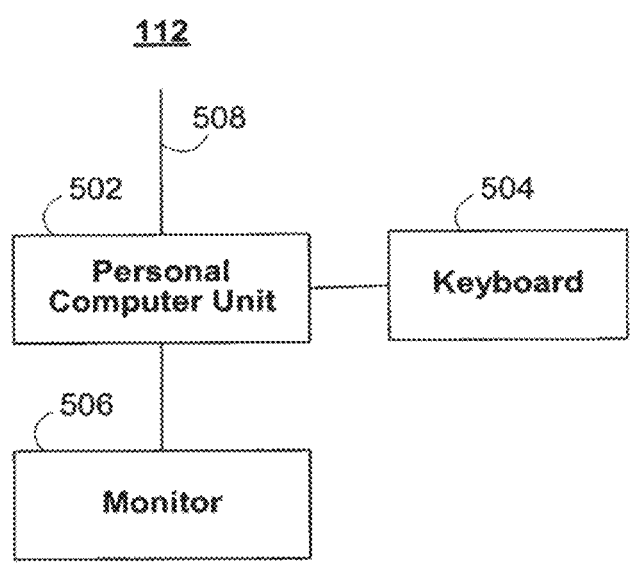
FIG. 5 is a diagram of an illustrative arrangement for the user computer equipment of FIG. 1 in accordance with one embodiment of the invention.

Illustrative user computer equipment 112 (FIG. 1) is shown in FIG. 5. User computer equipment 112 may be stand-alone or a part of home network 113 (FIG. 1). In the arrangement of FIG. 5, personal computer unit 502 may be controlled by the user using keyboard 504 and/or other suitable user input device such as a trackball, mouse, touch pad, touch screen, voice recognition system, or a remote control, such as remote control 400 of FIG. 4. Video content, such as television programming or web pages having video elements, and interactive media guidance application display screens may be displayed on monitor 506. Television and music programming, media guidance application data (e.g., television program guide data), video-on-demand content, video recordings played back from a network-based video recorder, and other data may be received from paths 118 and 138 (FIG. 1) using input/output 508. User commands and other information generated as a result of user interactions with the interactive media guidance application and system 100 (FIG. 1) may also be transmitted over input/output 508.

Personal computer unit 502 may contain a television or video card, such as a television tuner card, for decoding analog, digital, and high-definition television channels and for handling streaming video content. Multiple video cards (e.g., tuner cards) may be provided if desired. An illustrative television tuner card that may be used may contain an analog television tuner for tuning to a given analog channel, digital decoding circuitry for filtering out a desired digital television or music channel from a packetized digital data stream, and a high-definition television tuner for tuning to a high-definition channel. Any suitable card or components in computer unit 502 may be used to handle video and other content delivered via input/output line 508 if desired.

Personal computer unit 502 may contain one or more processors (e.g., microprocessors) that are used to run the interactive media guidance application or a portion of the interactive media guidance application.

Personal computer unit 502 may include a hard drive, a recordable DVD drive, a recordable CD drive, or other suitable storage device or devices that stores video, program guide data, and other content. The interactive media guidance application and personal computer unit 502 may use a storage device or devices to, for example, provide the functions of a personal video recorder.

User equipment, such as user equipment 108, user television equipment 110, user computer equipment 112, and user equipment located on home network 113 (FIG. 1), may be used with network equipment such as server 130, server 140, and equipment at service providers such as service provider 142 of FIG. 1 to provide network-based video recording functions. Video recording functions may be provided by storing copies of television programs and other video content on a remote server (e.g., server 130 or server 140) or other network-based equipment, such as equipment at a service provider such as service provider 142.

Video recordings may be made in response to user commands that are entered at user equipment 108 or user equipment located on home network 113 (FIG. 1). In a personal video recorder arrangement, the interactive media guidance application may be used to record video locally on the user equipment in response to the user commands. In a network-based video recorder arrangement, the interactive media guidance application may be used to record video or to make virtual recordings (described below) on network equipment such as server 130, server 140, or equipment at service provider 142 in response to the user commands. The user commands may be provided to the network equipment over the communications paths shown in FIG. 1. The personal video recorder arrangement and the network-based video recorder arrangement can support functions such as fast-forward, rewind, pause, play, and record.

To avoid unnecessary duplication in a network-based video recorder environment, system 100 may provide network-based video recording capabilities by using virtual copies or recordings. With this approach, each user may be provided with a personal area on the network that contains a list of that user's recordings. The video content need only be stored once (or a relatively small number of times) on the network equipment, even though a large number of users may have that video content listed as one of their recordings in their network-based video recorder personal area. Personal settings or any other suitable data may be stored in a user's personal area on the network.

Figure 6:
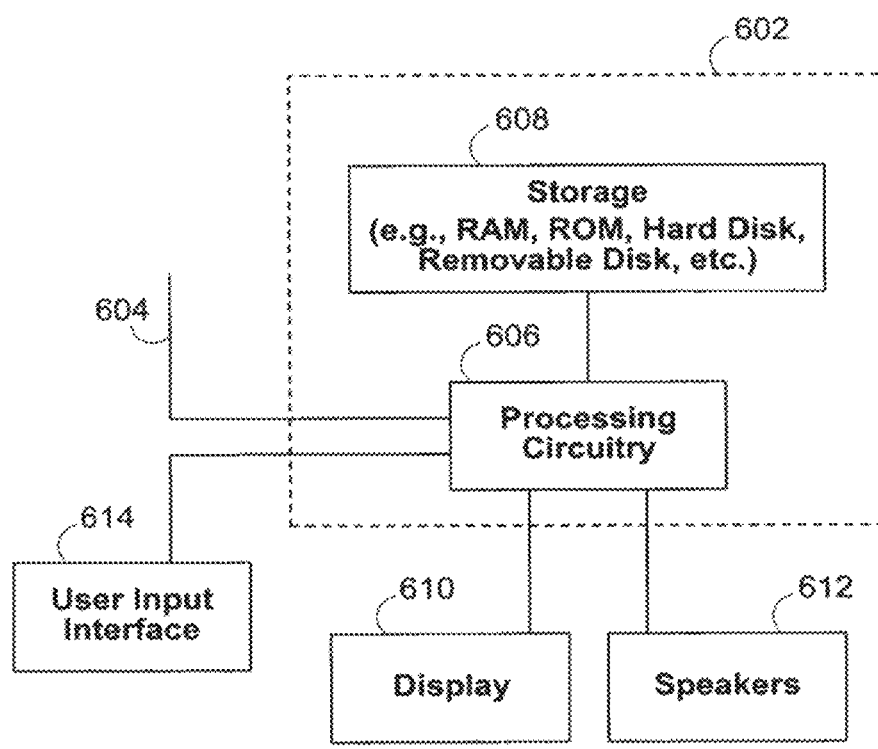
FIG. 6 is a generalized diagram of the illustrative user equipment of FIG. 1 in accordance with one embodiment of the invention.

The user television equipment and user computer equipment arrangements described above are merely illustrative. A more generalized embodiment of illustrative user equipment 10B, 110, and 112 (FIG. 1) and user equipment located on home network 113 (FIG. 1) is shown in FIG. 6. Control circuitry 602 is connected to input/output 604. Input/output 604 may be connected to one or more communications paths such as paths 114, 116, 118, 128, 136, and 138 of FIG. 1. Media (e.g., television programming, music programming, other video and audio, and web pages) may be received via input/output 604 (e.g., from programming sources 102, servers or other equipment, such as server 130, service providers such as service provider 142, distribution facility 104, etc.). Interactive media guidance application data, such as program schedule information for an interactive television program guide, may be received from data source 120 via input/output 604. Input/output 604 may also be used to receive data from data source 120 for other interactive television applications. The user may use control circuitry 602 to send and receive commands, requests, and other suitable data using input/output 604.

Control circuitry 602 may be based on any suitable processing circuitry 606 such as processing circuitry based on one or more microprocessors, microcontrollers, digital signal processors, programmable logic devices, etc. In some embodiments, control circuitry 602 executes instructions for an interactive media guidance application or other interactive application (e.g., web browser) from memory. Memory (e.g., random-access memory and read-only memory), hard drives, optical drives, or any other suitable memory or storage devices may be provided as storage 608 that is part of control circuitry 602. Tuning circuitry such as one or more analog tuners, one or more MPEG-2 decoders or other digital video circuitry, high-definition tuners, or any other suitable tuning or video circuits or combinations of such circuits may also be included as part of circuitry 602. Encoding circuitry (e.g., for converting over-the-air, analog, or digital signals to MPEG signals for storage) may also be provided. The tuning and encoding circuitry may be used by the user equipment to receive and display, play, or record a particular television or music channel or other desired audio and video content (e.g., video-on-demand content or requested network-based or local video recorder playback). Television programming and other video and on-screen options and information may be displayed on display 610. Display 610 may be a monitor, a television, or any other suitable equipment for displaying visual images. In some embodiments, display 610 may be HDTV-capable. Speakers 612 may be provided as part of a television or may be stand-alone units. Digital music and the audio component of videos displayed on display 610 may be played through speakers 612. In some embodiments, the audio may be distributed to a receiver (not shown), which processes and outputs the audio via speakers 612.

A user may control the control circuitry 602 using user input interface 614. User input interface 614 may be any suitable user interface, such as a mouse, trackball, keypad, keyboard, touch screen, touch pad, voice recognition interface, or a remote control.

The media delivery system of FIG. 1 allows users at user equipment 108, user television equipment 110, and user computer equipment 112 to view media content at virtually any user-selected time. Typically, a signal is sent from the user equipment to distribution facility 104 via communications paths 114, 116, and/or 118 requesting on-demand media content. Alternatively or additionally, the user equipment could request media content via communications network 126, which could include the Internet. Through VOD or other similar services, distribution facility 104 may then deliver the user-requested content to the user equipment for presentation. Therefore, media system 100 (FIG. 1) may make selected television programming and other media content available to the user equipment after the programming or content was initially broadcast or aired. A user may then request and view the media content on the user's own schedule.

However, some media content contains a temporal component, such as a recommended order of viewing. For example, a television program series, a set of movie sequels, and a sporting event series are typically intended to be watched serially, i.e., one episode, show, or game after another. If the user watches the series out of order, certain fact patterns, characters, and themes may be out of place in the series timeline. Some episodes in the series may be encapsulated single episodes that may be watched out of order, while other episodes may rely on plot details and other information from one or more previous episodes. In addition, some episodes may be arching episodes that contain plot information relevant to the entire series. For example, the first episode in a program series may introduce key characters and over-arching themes. A user should watch these arching episodes before watching any other episodes in the series that rely on, or make reference to, the arching episodes.

There are many other examples of temporal components commonly found in media content. For example, some media content may include multiple parts that should be watched sequentially. These multi-part shows are often linked together with "to be continued" messages at the conclusion of each part. A user who watches the multi-part content out of sequence (or fails to watch a part entirely) may miss overriding themes, the introduction of new characters, and other plot events. The aforementioned temporal components are presented for the purposes of illustration and not limitation. Many other examples of temporal components may be found in popular media content.

In addition, the user may inadvertently watch other media content that contains spoilers or other undesirable or irrelevant content about programs the user has not yet seen, but have already been broadcast or otherwise made available to the user equipment. Spoilers may include any information that can reveal (and thereby "spoil") a plot point in a movie, program, show, etc. that the user has not yet seen. To reduce the presentation of this undesirable content, the interactive media monitoring application may create and maintain user media profiles that track the user's progress through user-selected series of programming, episode by episode, show by show, or game by game. When the user has completed viewing an episode in the series, the interactive media monitoring application may update the appropriate entry in the user's media profile to reflect the completion of the episode. In some embodiments, a user is associated with one media profile containing all the user-selected media content to be monitored. In other embodiments, a user is associated with a separate media profile for each series of related programs to be monitored.

In some embodiments, media profiles may be portable. For example, a user who accesses public or remote user equipment in media system 100 (FIG. 1) may be authenticated and presented with the user's current "roaming" media profile. This roaming profile could be stored at any suitable location in media system 100, including, for example, the user equipment, distribution facility 104, server 130, and/or server 140 (FIG. 1). In addition, updates to the user's roaming profile may be committed and stored to a network location (e.g., the user's home user equipment, distribution facility 104, server 130, and/or server 140 of FIG. 1). This way, media profiles are updated even when the user is accessing user equipment other then the user's primary user equipment (e.g., the user equipment residing at the user's home or office). Users may also access their media profile at public user equipment, such as user equipment kiosks, or at another location, such as a friend's user equipment.

For example, a user may record Game 2 of the World Series and not have time to watch the game. If the World Series is added to the user's media profile, the user may access his or her media profile from any suitable device with network access. The interactive media monitoring application may then filter or replace any content presented on the user device related to Game 2 of the World Series. For example, the score of the game may be removed or replaced from Internet page headlines that are accessed from the user's office computer or PDA. After the user watches the game, the interactive media monitoring application may update the user's profile to reflect the user's new viewing progress.

Figure 7A:
FIGS. 7A and 7B show illustrative user profile and media profile records in accordance with one embodiment of the invention.
Figure 7B:

FIGS. 7A and 7B show illustrative user profile record 700 and media profile record 710 in accordance with one embodiment of the invention. User profile record 700 includes user column 702 and profile column 704. User column 702 may include the usernames (or other unique identifier) of all or some of the users accessing the local user equipment. Profile column 704 may contain pointers to the media profile or profiles associated with the user in user column 702. In some embodiments, users may be associated with a single profile for all media content. In other embodiments, users may be associated separate media profiles for each series to be monitored. Additionally or alternatively, users may be associated with a local media profile and a roaming media profile. A user's roaming media profile may be available by any user equipment in the media system. The interactive media monitoring application may read user profile record 700 after accessing the user equipment, the media system, or the monitoring application. The interactive media monitoring application may then follow the pointers contained in profile column 704 to access the profiles associated with the current user. Media profiles may be stored locally at the user equipment or at any convenient location within media system 100 (FIG. 1).

Media profiles may be stored in any convenient fashion (e.g., as records in one or more relational databases, as lists in memory, and/or as files on a hard drive or other storage media). If the media profiles are stored remote from the user equipment, the user equipment may access the profiles through any available communications path (e.g., communications path 128 and/or 114 of FIG. 1) or service. Additionally or alternatively, media profiles may be downloaded periodically to the user equipment or the user equipment may periodically query a remote server (e.g., server 140 and/or server 130 of FIG. 1) to deliver media profile updates to the user equipment. The user equipment may also commit media profile changes to a server or remote location for access by any user equipment in media system 100.

Media profile record 710 shows an illustrative media profile record stored in a relational database. Media profile record 710 may contain program column 712, progress column 714, position column 716, and last action column 718. The various programs monitored by the interactive media monitoring application may be listed in program column 712. Associated with each program in program column 712 may be a media progress indicator, a position indicator, and a last action indicator. Progress column 714 may contain the user's current viewing progress. For example, the user's season number and/or episode number may be contained in progress column 714. The episode and season number may be separated in progress column 714 by any suitable delimiter. If the user has not completed the entire episode of the series listed in program column 712, position column 716 may contain the user's elapsed viewing time within the episode. Finally, last action column 718 may contain the user's last monitored action, if appropriate. For example, last action column 718 may include a macro corresponding to the user's most recent action in the series. Macros may include, for example, "SK" if the user skipped the last episode, "WA" if the user watched the last episode, "SC" if the user scheduled the last episode for viewing at a later day or time, and "BP" if the user delayed his or her viewing schedule by one or more episodes. Other macros may be included in last action column 718 as appropriate. Last monitoring actions are discussed in more detail below in regard to viewing progress display 1200 (FIG. 12).

Records 700 and 710 are exemplary. Other records containing more or less information may also be used, as desired. Records 700 and 710 may be stored in any convenient data structure and on any suitable storage or memory device. The storage format of data in records 700 and 710 may also be modified, if desired. Records 700 and 710 may be manipulated and maintained by the interactive media monitoring application, other applications resident on the user equipment, distribution facility 104 (FIG. 1), or any other device in the media system.

Figure 8A:
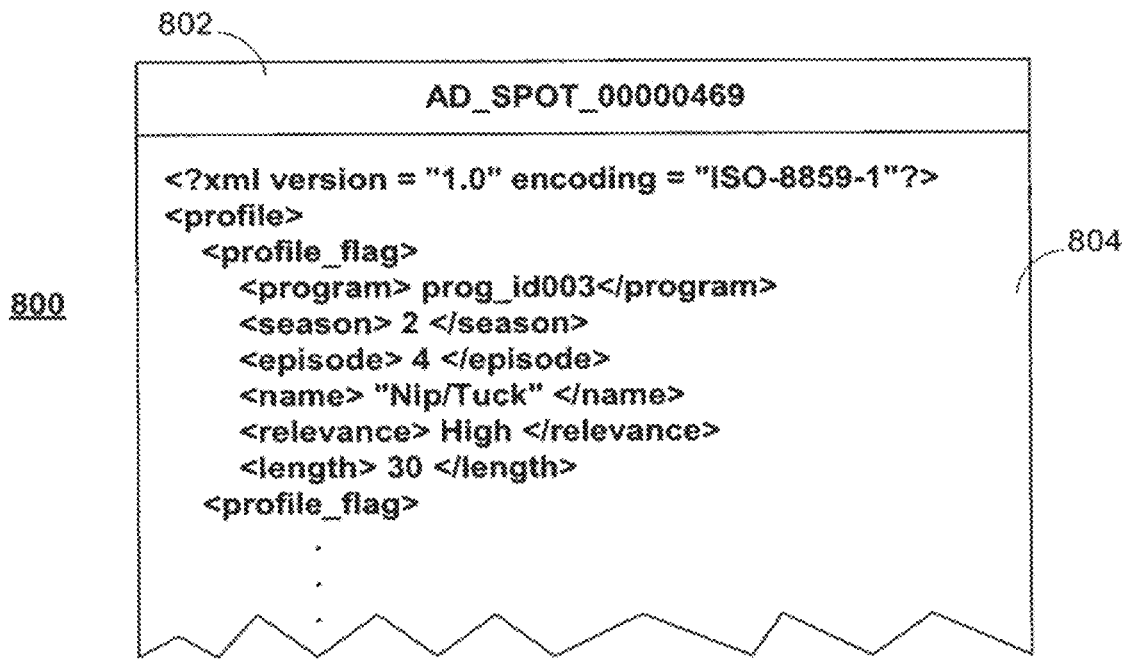
FIGS. 8A and 8B show illustrative profiles flags associated with media content in accordance with one embodiment of the invention.
Figure 8B:
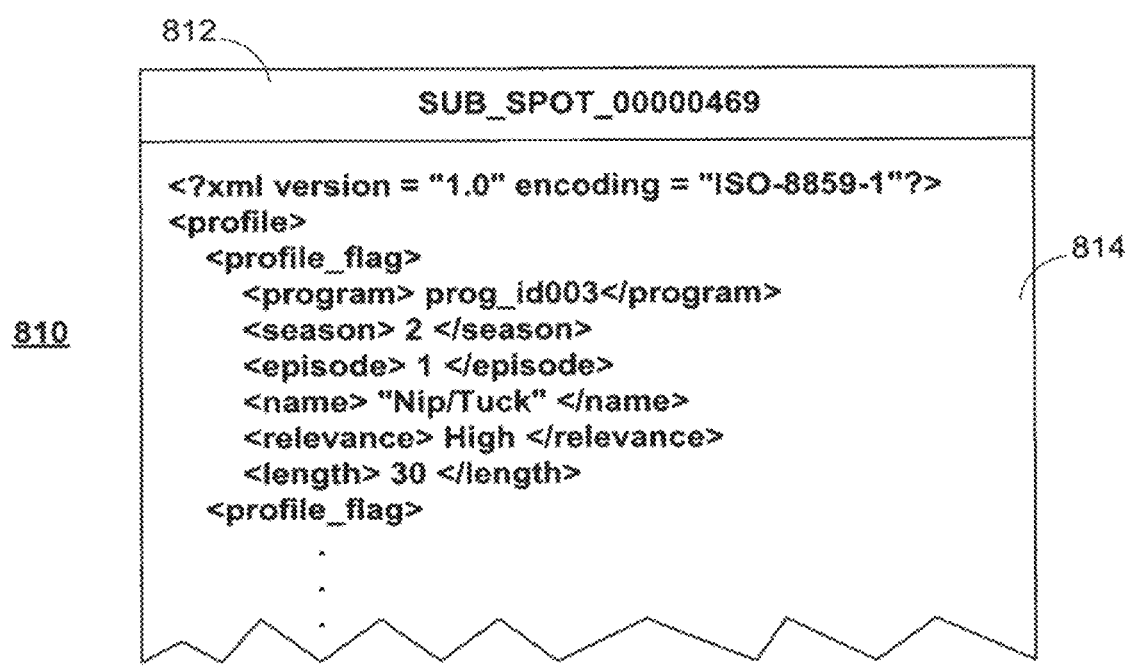

FIGS. 8A and 8B show illustrative media profile flags 800 and 810 in accordance with one embodiment of the invention. The interactive media monitoring application may remove or replace any media content that is determined to be inconsistent with the user's current viewing progress. Content substitutions may be based, in part, on metadata associated with the substitute content and/or the content to be substituted. Metadata may be used to describe programming and may include any information that may be associated with a program and/or that may describe a program, its content, or services related to a program. Further features of an illustrative system for delivering metadata-linked content is described in Moore et al. U.S. Patent Application Publication No. 20010047298, which is hereby incorporated by reference herein in its entirety.

The interactive media monitoring application may analyze content metadata in the form of profile flags associated with certain media content accessible by the user equipment. For example, advertisements, news segments, and web content may be associated with one or more media profile flags. These media profile flags may indicate that the media content is related to, or associated with, one or more program series identified in the flags. These flags may be stored in any suitable format. In the example of FIGS. 8A and 8B, media profile flags are defined using a mark-up language, such as XML. However, any suitable data structure may be used to store media profile flags or any other metadata associated with media content.

Media profile flag 800 may be associated with advertisement 802 or any other content accessible by the user equipment. Advertisement 802 may include broadcast media content, recorded media content, or media content stored on data source 120 (FIG. 1) or substitute data/content source 902 (FIG. 9) described below. Media profile flag 800 is associated with tag 804, which may indicate the program or programs that relate to advertisement 802. In the example of FIG. 8A, tag 804 indicates that advertisement 802 relates to season 2, episode 4 of the broadcast series "Nip/Tuck." Tag 804 may indicate that advertisement 802 is related to one or more programs by associating more than one profile flag with tag 804. For example, tag 804 may indicate that advertisement 802 is also related to season 2, episode 1 of the broadcast series "Nip/Tuck" by including another profile flag in tag 804. Some programming, such as programming with a strong temporal component, may be associated with numerous profile flags. For example, an advertisement relating to season 2, episode 4 of the series "24" may be associated with profile flags for all the previous episodes in the season and all the episodes in the previous season. There is no limit to the number of profile flags that may be associated with media content. Tag 804 may also indicate the length of advertisement 802, the relevance level to the program identified by the profile flag, and any other suitable information.

Media profile flag 810 of FIG. 8B may be associated with substitute content 812. The interactive media monitoring application may analyze media profile 810 to determine its candidacy for substitution with advertisement 802 (FIG. 8A). In the example of FIG. 8B, tag 814 may indicate that content 812 relates to season 2, episode 1 of the broadcast series "Nip/Tuck." Tag 814 may also indicate the length of substitute content 812, the relevance level to the program identified by the profile flag, and any other related information.

Figure 9:
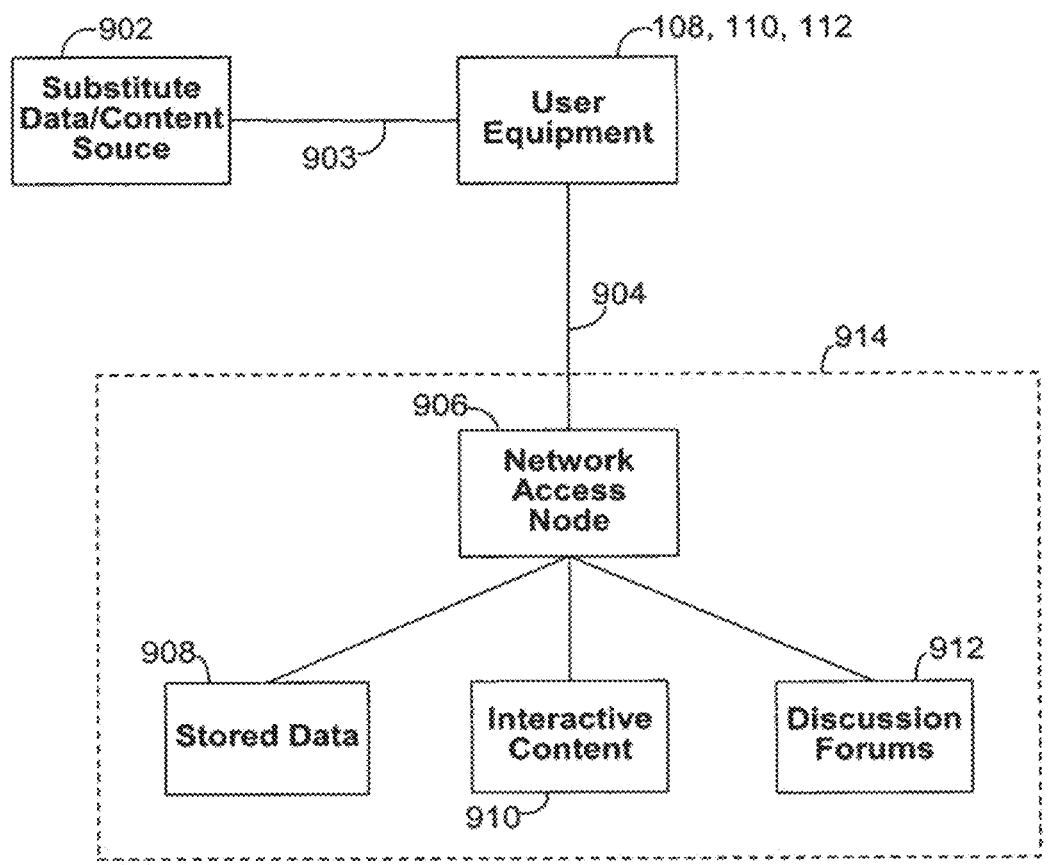
FIG. 9 is a diagram of illustrative network resources accessible by the user equipment of FIG. 1 in accordance with one embodiment of the invention.

FIG. 9 shows illustrative network resources 914 and substitute data/content source 902 accessible by user equipment 108, 110, and 112 in accordance with one embodiment of the invention. Communications paths 903 and 904 may be any suitable paths, including one or more of communications paths 114, 116, 118, 128, 136, and 138 of FIG. 1. Network access node 906 may comprise any network access point, modem, or communications circuitry. Through network access node 906, the user equipment may connect to a variety of interactive forums. These interactive forums may include real-time forums (e.g., chat, instant message, or other similar forums). Network access node 906 may connect the user equipment with stored data 908, interactive content 910 (e.g., interactive games), and discussion forums 912. Discussion forums 912 may include web logs (blogs), chat rooms, newsgroups, electronic bulletin boards, or any other electronic forum capable of exchanging messages and/or content between a plurality of network users. Interactive content 910 and discussion forums 912 may access stored data 908, which may contain, for example, stored messages or postings, forum membership lists, user preferences, etc. These forums may be accessible through the public Internet or accessible only through a private or secured network.

The user equipment may have the ability to create new discussion forums based on a user's media profile and control the new forum's membership. For example, a user who has just watched a certain episode of a broadcast series may be automatically connected to a new discussion forum associated with the episode. The interactive media monitoring application may associate topic data with the forum indicating that the forum is related to a particular program, show, or other media content. For example, the interactive media monitoring application may analyze media profile data and connect the user to an Internet chatroom associated with an episode of "24" the user has just watched. The interactive media monitoring application may also connect a user to forums relating to previously watched episodes or connect a user to a forum with other users with a similar viewing progress in a particular series. In some embodiments, the interactive media monitoring application may create or connect a user to a forum relating to more than one series. For example, users who recently watched season 1, episode 2 of "Nip/Tuck" and season 2, episode 4 of "24" may be connected to the same forum. In this way, a community of forum members that have similar viewing experiences may interact and converse in real-time, if desired.

The user equipment may also be connected to substitute content/data source 902 through communications path 903. Substitute content/data source 902 may include a set of substitute media content for presentation on the user equipment. This set of substitute content may be tailored to a user's current viewing progress on the user equipment. For example, if a user at the user equipment has watched only episodes 1 and 2 of the series "24" on the FOX® network via VOD or DVR services, the interactive media monitoring application may assemble substitute content/data source 902 to contain advertisements, promotions, news segments, and other media content associated with watched episodes or the next unwatched episode in the series (i.e., episode 3). The interactive media monitoring application may analyze media profile flags of content accessible by the user equipment to determine which content should be included in substitute content/data source 902. In this way, the interactive media monitoring application may create one or more substitute data sources containing content for replacing media content inconsistent with a user's current viewing progress. The media content replacement may create a media environment that is more consistent with the user's current viewing progress.

In some embodiments, substitute content/data source 902 contains content related to all episodes in a series of related programs and is indexed by program name, season number, and/or episode number for easy access by the interactive media monitoring application. Substitute content/data source 902 may be at least partially stored at the user equipment, if desired. In other embodiments, substitute content/data source 902 is stored at distribution facility 104, server 130, data source 120, service provider 142, or any other suitable location in system 100 (FIG. 1).

To access the interactive media monitoring application, the application's media profiles, or associated application functions, a user may log-in or be authenticated by a device of media system 100 (e.g., distribution facility 104 and/or server 130). Upon log-in or authentication, the user may access data saved by or for the user including, for example, the user's media profile, substitute media content, and other application settings and data. The settings and data may be stored on any device of media system 100 (e.g., distribution facility 104 and/or server 130). In some embodiments, a user device may automatically log-in or authenticate a user on behalf of the user of the device. For example, the user device may automatically send its log-in information (available from a previous log-in or authentication of the user) over a communications path to the appropriate device of system 100 and access the interactive media monitoring application features. Biometric authentication (e.g., a fingerprint scan, voice verification, and/or an iris scan) may authenticate the user at the device of media system 100 before sending the user's log-in information. In some embodiments, the interactive media monitoring application may prompt the user for log-in or authentication information (e.g., when the user accesses some user equipment in the media system).

FIGS. 10-17 show illustrative interactive media monitoring application display screens. The display screens may be displayed to the user as part of an interactive media application accessed over a suitable communications link or the screens may be displayed locally on the user equipment currently being accessed by the user. FIGS. 10-17 are shown and described herein in the context of illustrative interactive media monitoring application display screens. Any other suitable pages or display screens may be used. Display screens of the interactive media monitoring application as shown in FIGS. 10-17 use commonly-used application selection objects such as hyperlinks, buttons, lists, drop-down boxes, and checkboxes. It will be understood that these selection objects are only illustrative, and other selection objects can be used by those skilled in the art without departing from the scope and spirit of the present invention.

Figure 10:
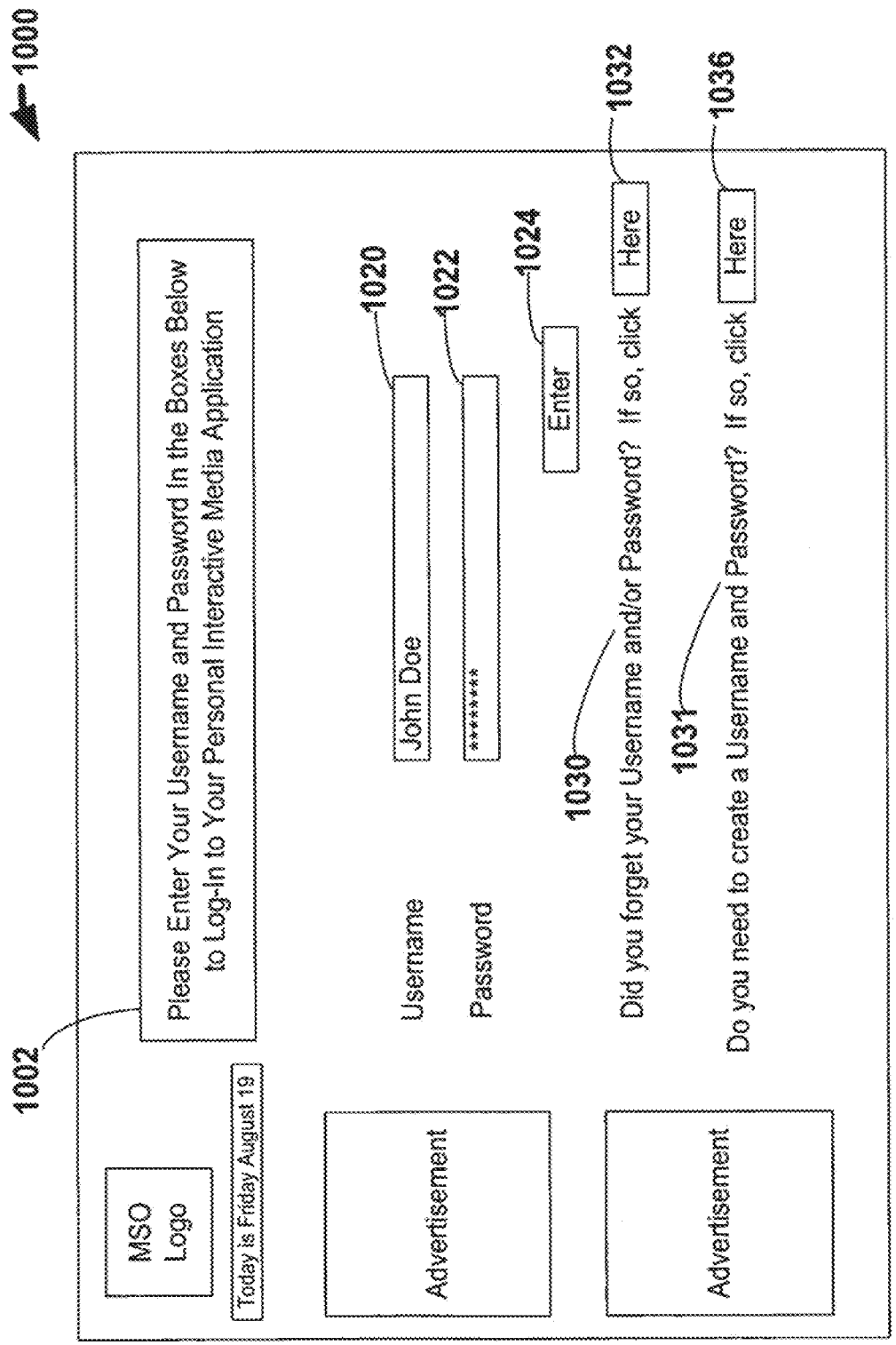
FIG. 10 is an illustrative display of a log-in or authentication screen for the interactive media monitoring application in accordance with one embodiment of the invention.

FIG. 10 shows illustrative log-in (or authentication) display screen 1000 that the interactive media monitoring application may display on the user equipment. In some embodiments, users may always be required to log-in using log-in screen 1000. In other embodiments, users may be required to log-in only if the interactive media monitoring application is in multi-user mode. If the interactive media monitoring application is setup for single-user mode, log-in screen 1000 may be bypassed (or authentication credentials of the user may be automatically supplied). The user may access screen 1000 by any suitable means including, for example, pressing PROFILES key 420 of remote control 400 (FIG. 4) or other suitable key or key sequence, navigating from another interactive media monitoring application screen (e.g., when navigating from a public screen to a user-specific or private screen), or by any other suitable means. Log-in screen 1000 may be integrated with log-in display screens from other interactive media applications so that one "master" log-in screen is displayed on the user equipment. Authentication tokens may be passed between interactive media applications so that all applications receive the same authentication credentials.

Log-in screen 1000 includes information section 1002 that provides instructions for the user to enter the user's username and password to log-in (or authenticate) to the interactive media monitoring application. The user may use a user input device (e.g., remote control 400 of FIG. 4) to enter his username in a username box (e.g., box 1020) and his password in a password box (e.g., box 1022). The user may submit the username and password using a enter option (e.g., button 1024). Log-in screen 1000 may include an option (e.g., button 1032) that the user may select if the user has forgotten his username and/or password, as indicated by description 1030. In response to selecting the forgotten username/password option, the interactive media monitoring application may transmit the appropriate username and password to the user (e.g., by electronic mail, regular mail, text message, and/or telephone). Log-in screen 1000 includes an option (e.g., button 1036) for creating a new user account, as indicated by description 1031. In response to selecting button 1036, the interactive media monitoring application may prompt the user to create a new username and password, which may be transmitted to the appropriate device of system 100 (e.g., distribution facility 104 and/or server 130).

The interactive media monitoring application may transmit username and password data entered by the user to the appropriate device of system 100 (e.g., the user equipment, distribution facility 104, and/or server 130), which may in turn compare data to authentication data stored on the system to authenticate the user. Once the user has been authenticated, the interactive media monitoring application may retrieve the user's media profile and access or connect to any substitute media content or data sources required to present the user with a consistent media environment. For example, substitute advertisements may be downloaded from a server (e.g., server 130 and/or server 140), data source (e.g., data source 120 or substitute data/content source 902 of FIG. 9), or network provider to replace any advertisements relating to future or unwatched episodes of media content contained in the user's media profile. In some embodiments, content relating to the next unwatched episode or program in the series is considered consistent with the user's media profile, while more distant programs in the series are considered inconsistent with the user's media profile. For example, in some embodiments, a user, who has watched through episode 5 of a certain television series, may be presented with advertisements relating to episode 6 of the series, but advertisements relating to episode 7 and beyond may be removed or replaced with content from the substitute content or data source. This reduces irrelevant or undesired content (e.g., spoilers) from being presented on the user equipment.

Figure 11:
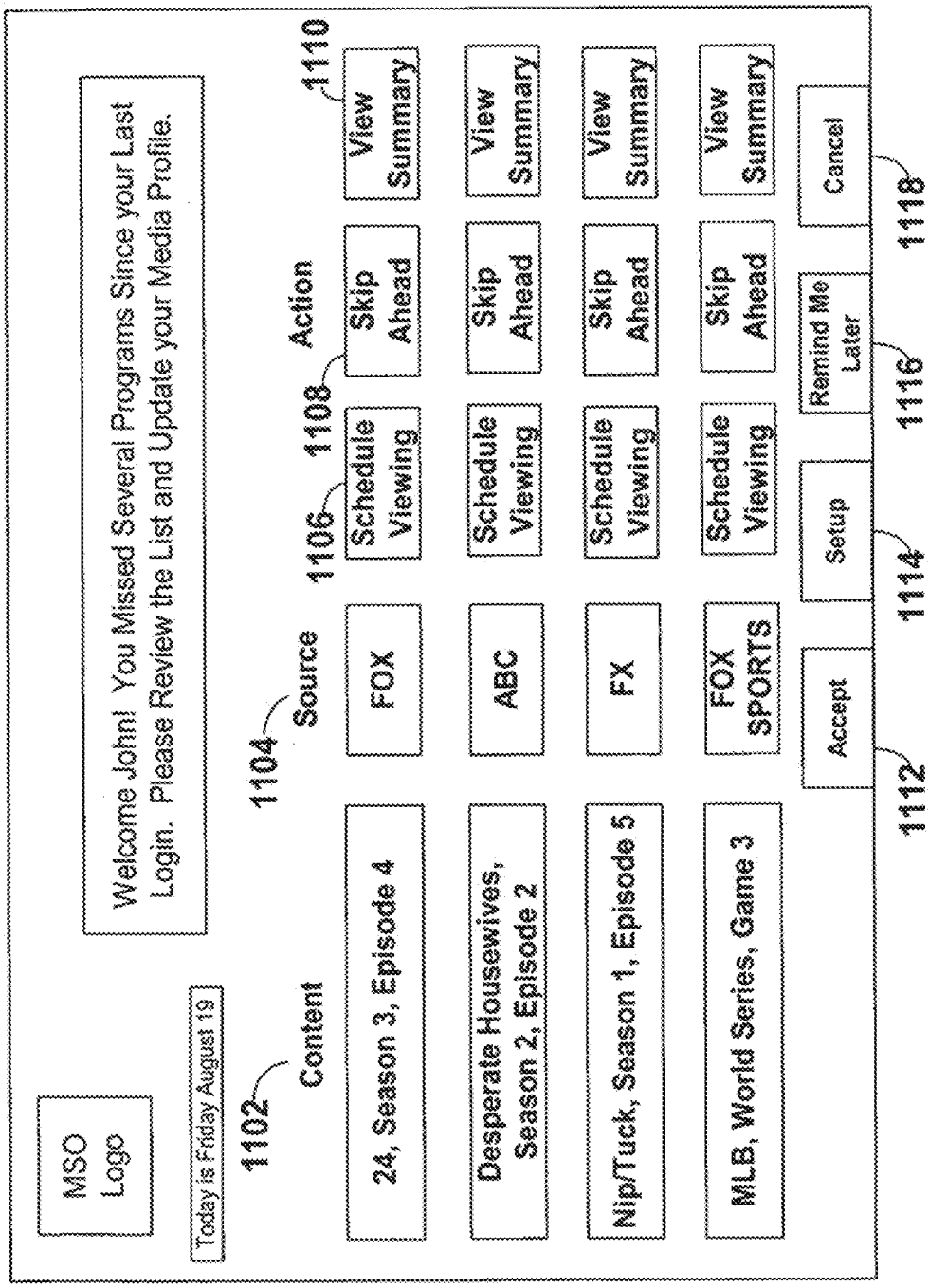
FIG. 11 is an illustrative display of a user welcome summary screen in accordance with one embodiment of the invention.

FIG. 11 shows illustrative user welcome summary display screen 1100 in accordance with one embodiment of the invention. In some embodiments, upon logging into the interactive media monitoring application, a user may be presented with summary screen 1100. A user may also access summary screen 1100 via an interactive program guide or another interactive media application. Summary screen 1100 may list the programs or other media content that the user has missed since the user's last log-in to the interactive media monitoring application. The programs displayed in content column 1102 may correspond to programs the interactive media application is monitoring for the current user (i.e., programs, series, or other media content the user has included in the user's media profile to be monitored). In some embodiments, the programs to be monitored are included in program column 712 of media profile record 710. In the example of FIG. 11, content column 1102 contains three broadcast series and one broadcast sporting event. Source column 1104 lists the channel or source of the media content in content column 1102. The user may select one or more of actions 1106, 1108, and 1110 for each program listed in content column 1102 by highlighting the appropriate selection and selecting accept button 1112. For example, the user may schedule viewing of a missed episode for a later date and time by selecting schedule selection 1106. The scheduled program may then be automatically accessed and presented on the user equipment at the scheduled date and time. To skip the episode and advance the user's media profile as if the episode had been watched, the user may select skip selection 1108. A user may then be given options similar to actions 1106, 1108, and 1110 relating to subsequent media content related to the media content in content column 1102. For example, the user's media profile may advance to the next episode in the series. To view a content summary of the missed episode, the user may select summary selection 1110. Upon selecting summary selection 1110, the user may be presented with a text-only content summary, a text and graphics content summary, or a content summary containing text, graphics, and video.

Several options may be presented to a user for watching a program or series of programs on a time-shifted basis depending on such factors as, for example, the type of program (e.g., whether the program is more of a serial program or more of an episodic program), how far the user's viewing progress is behind, etc. Exemplary options may include: (1) watch this program now; (2) watch this program before the next episode in the series (or at the next regularly schedule time for this program); (3) show the user a summary (video/highlights, text, or a combination of the two) of this episode (e.g., via tvguide.com, or TV Guide Spot) so that the user can keep up with the series even though the user does not wish to watch this entire episode; or (4) skip this episode. Other suitable viewing options may also be presented.

The content summary may be at least partially derived from one or more data sources, such as tvguide.com and/or TV Guide Spot. TV Guide Spot, which is available online and via an interactive channel accessible by the user equipment, features original entertainment programming designed to help viewers decide what to watch. TV Guide Spot also provides showcase segments on upcoming programming and events, "catch-up" segments that update viewers on plot developments of popular shows, and many other interactive features. In some embodiments, closed captioning data is analyzed and used to create content summaries, as described in more detail in patent application Ser. No. 11/324,187, filed Dec. 29, 2005, which is hereby incorporated by reference herein in its entirety. After being presented with the content summary, the user may watch the full program, schedule the program for presentation on the user equipment at a later date and time, or skip the program and advance the user's media profile.

To configure settings for the interactive media monitoring application, the user may select setup button 1114. Upon selecting setup button 1114, the user may be linked to settings screen 1300 (FIG. 13) described below. To setup an episode viewing reminder, such as the reminder of FIG. 14 (described below), the user may select reminders button 1116. To exit welcome summary screen 1100 without making any changes, the user may select cancel button 1118. To accept the selections made in summary screen 1100, the user may select accept button 1112.

Figure 12:
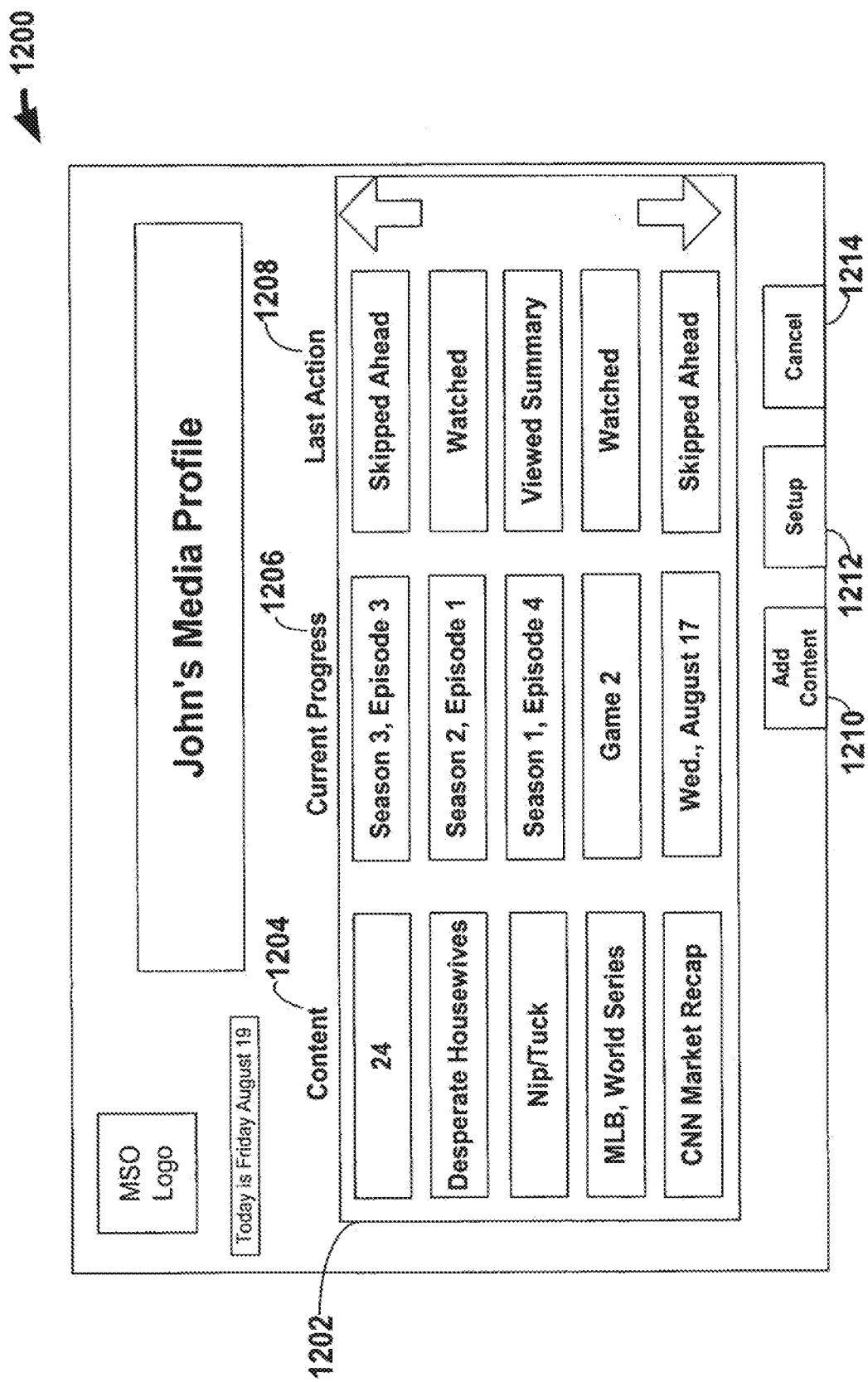
FIG. 12 is an illustrative display of a user media viewing progress screen in accordance with one embodiment of the invention.

FIG. 12 shows illustrative user media viewing progress screen 1200 in accordance with one embodiment of the invention. In one embodiment, progress screen 1200 may be accessed via PROFILES button 420 of remote control 400 of FIG. 4. In other embodiments, progress screen 1200 is accessed via a link from another interactive media application, such as an interactive program guide. Media viewing progress screen 1200 displays a user's current viewing progress of user-selected media content included in the user's media profile. For example, the programs included in media profile record 710 (FIG. 7B) may be included in progress screen 1200. Media content included in media content summary region 1202 may include any content capable of being displayed by, presented to, or recorded by, the user equipment 110 of FIG. 1. Typically content included in media content summary region 1202 has a pre-defined viewing order, as with a traditional broadcast series and sporting event series, so that the interactive media monitoring application may track a user's progress through the series of related programs.

Media content summary region 1202 may include content column 1204, progress column 1206, and last action column 1208. The name or title of the monitored media content may be displayed in content column 1204. Next to each content name, the user's current viewing progress may be listed in progress column 1206. In some embodiments, the season and episode number are tracked. In other embodiments, only the episode number is tracked. For example, in the illustrative display screen of FIG. 12, the current user has watched through season 3, episode 3 of the series "24" on the FOX® network. In some embodiments, this indicates that the user has watched episodes 1 through 3 of season 3 only. In other embodiments, this viewing progress indicates that the user has watched episodes 1 through 3 of season 3 and all the episodes in any previous season or seasons (e.g., seasons 1 and 2). The user may setup the user's media profile to track a user's viewing progress through the series as a whole or through the series on a season basis. The current progress in progress column 1206 indicates that the user's last completed program in the series is season 3, episode 3. In an alternate embodiment, progress column 1206 may display the next episode for the user to watch. A user may highlight any entry in progress column 1206 to automatically present the next unwatched episode in the series on the user equipment. In some embodiments, if a user's current viewing progress is consistent with the progress being broadcast or otherwise made available to the user equipment (e.g., released as a VOD, PPV, or on-demand content selection), then progress column 1206 may display the date and/or time the next program will be broadcast or otherwise made available to the user equipment.

The interactive media monitoring application may use information stored in the user's media profile to remove or replace any media content that is inconsistent with the user's current viewing progress. For example, an advertisement promoting season 3, episode 7 of the series "24" may be replaced with an advertisement promoting season 3, episode 4, which may be the user's next unwatched episode as indicated by the user's media profile. The user may change the current viewing progress in the user's media profile by selecting any progress indicator in progress column 1206. For example, a user may wish to advance or reset his or her viewing progress so that Game 3 of the MLB, World Series is reflected as watched. The user may wish to change the user's viewing progress if the user watched an episode in the series at a location not monitored by the interactive media monitoring application. The user may highlight the appropriate indicator in progress column 1206 and press an appropriate command (e.g., the left or right arrows on remote control 400 of FIG. 4) to change the progress indictor associated with the series.

The user's last viewing action associated with each entry in media content summary region 1202 is displayed in last action column 1208. For example, actions in last action column 1208 may include "Skipped Ahead," "Watched," "Viewed Summary," "In Progress," "Scheduled," or any other supported media action. In some embodiments, last action column 1208 may also display the user's most recent viewing status. For example, if the user attempted to view the program, but stopped the program before the program completed, the "Interrupted" status may be displayed in last action column 1208 along with the time or position within the program where the was interrupted or stopped viewing the program. A link to start the program where the user left off may also be displayed in last action column 1208.

To add new media content to a user's media profile, a user may select add content button 1210. The interactive media monitoring application may then link to program guide data (perhaps associated with an interactive television program guide) to present a listing of available media content that may be included in the user's media profile. A user may add content to the user's media profile in several other ways as well. For example, the user may highlight or select a program from any interactive media application display screen and select the appropriate "Add to Media Profile" option to add the series associated with the program to the user's media profile. In some embodiments, content may be added to a user's media profile automatically. For example, the interactive media monitoring application may monitor a user's viewing habits, including, for example, what programs are watched and how often programs are watched. The interactive media monitoring application may then automatically add certain content to the user's media profile. For example, the interactive media monitoring application may add a broadcast series to a user's media profile after more than one episode within the series has been watched by the user. As another example, when a user schedules a series recording via an interactive program guide or other interactive media application, the interactive media monitoring application may automatically add the program series to the user's media profile. Other criteria for automatically adding a program series to a user's media profile may also be used.

Some content may be ineligible for inclusion in the user's media profile. For example, the interactive media monitoring application may be unable to process broadcast programming without a temporal or series component (such as some feature movies and most websites). In some embodiments, the user may be unable to select this content in a media listing presented to the user. In other embodiments, the "Add to Media Profile" option is not associated with media content without a temporal component. To change settings of the interactive media monitoring application, the user may select setup button 1212. Upon selecting setup button 1212, the user may be linked to settings screen 1300 (FIG. 13) described below. To exit the user's media profile progress screen, the user may select cancel button 1214.

Figure 13:
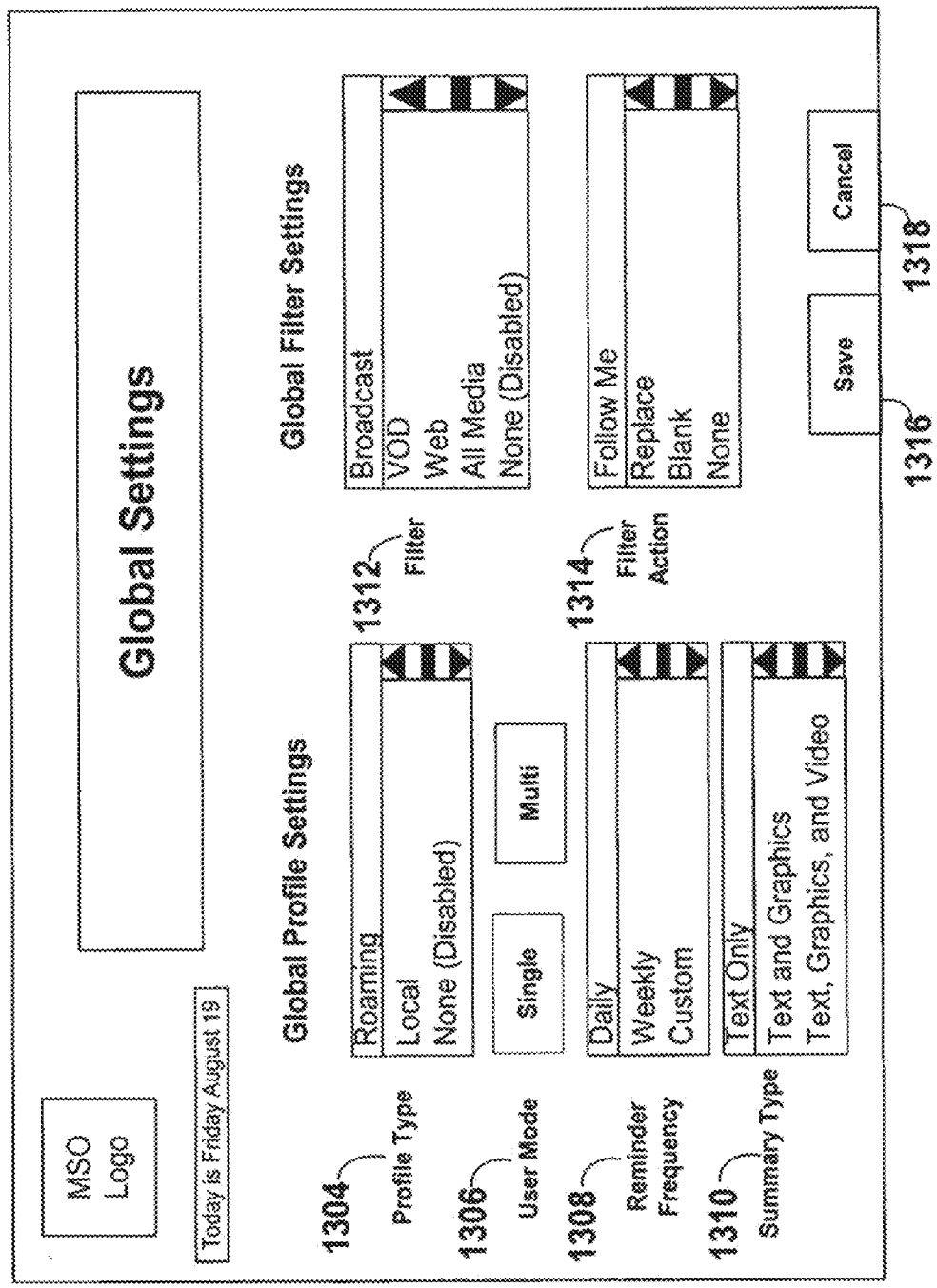
FIG. 13 is an illustrative display of a media monitoring application setup screen in accordance with one embodiment of the invention.

FIG. 13 shows an illustrative setup screen for customizing the media monitoring application in accordance with one embodiment of the invention. The settings and categories of settings described in connection with FIG. 13 are merely for illustration and are not meant to limit the settings that may be provided in the present invention. The settings in global settings screen 1300 may be divided into profile settings and filter settings. Profile settings may include the profile type, user mode, reminder frequency, summary type, and any other profile setting. The user may select to use local, roaming, or no media profiles via profile type choice 1304. If a roaming profile is selected, the user's media profile is made available to other user equipment within the user's media system. For example, a profile could be converted to a roaming profile by caching or copying the user's media profile on distribution server 104, server 130, server 140, or any other suitable location within system 100 (FIG. 1). Alternatively or additionally, roaming profiles may be accessible via a communications network connected to the user equipment. For example user media profiles may be stored on a file server and made accessible to authorized users via the Internet. Once a user is successfully authenticated (or a device associated with the user is successfully authenticated), the user's roaming profile may be downloaded or accessed from a location remote from the user equipment and applied to the user equipment that the user is currently using to access the interactive media monitoring application. In this way, a user's media profile may be portable throughout media system 100 (FIG. 1) and other similar media systems.

If the user selects a local media profile from profile type choice 1304, the media profile may not be available by other user equipment in the user's media system. The use of local media profiles may reduce network traffic since local media profiles may be stored at the local user equipment. Local media profiles may be converted to roaming (and vice versa) at any time. If the user wishes not to use media profiles, the user may select to disable media profiles by selecting "None" from profile type choice 1304.

The user may select a user mode via user mode selection 1306. In some embodiments, every user that accesses a piece of user equipment shares the same media profile. In these embodiments, called single-user mode, log-in screen 1000 (FIG. 10) may be automatically bypassed. The user may select multi-user mode by selecting the "Multi" setting in user mode selection 1306. When multi-user mode is enabled, each user accessing the user equipment is required to log-in via log-in screen 1000 so that the interactive media monitoring application can determine which media profile to use. In some embodiments, multiple users may be logged in at the same time. This may be desirable in the present invention if, for example, multiple users are watching a television program at the same time. With multiple users logged in at the same time, the interactive media monitoring application may update more than one media profile upon the presentation of a single program.

Using reminder frequency choice 1308, the user may select to receive daily, weekly, or custom viewing reminders relating to media in the user's media profile. For example, if the user is behind in watching a certain series (with respect to what has been broadcast or otherwise made available to the user equipment), the interactive media monitoring application may remind the user to take appropriate action (e.g., watch the missed episode(s) before the next episode is aired, view a summary of the missed episode or episodes, and/or schedule the missed episode or episodes to be automatically viewed at a later time). Reminders may be scheduled to be displayed on any convenient schedule. If the desired schedule is not displayed in reminder frequency choice 1308, the "Custom" option may be selected to setup a tailored schedule.

The user may select the default content summary type in summary type choice 1310. Several content summaries may be available, including text-only content summaries, text and graphics content summaries, and text, graphics, and video content summaries. Content summaries may be stored on the user equipment or at a remote location in media system 100 of FIG. 1 (e.g., distribution facility 104 and/or data source 120). Summary type choice 1310 allows a user to define the type of content summaries displayed on the user equipment. This setting may be useful in low bandwidth or high network latency environments to restrict what type of content summaries are presented on the user equipment.

Settings display screen 1300 may also include filter settings. Filter content choice 1312 lists the available types of media to be filtered. Filter content choice 1312 may include, for example, broadcast, VOD, and web content. For each of the content types selected in filter content choice 1312, the interactive media monitoring application may take some action when the media monitoring application encounters content that is inconsistent with the user's media profile. For example, advertising and news segments within a live broadcast may contain content related to one or more unwatched episodes in the user's media profile. The interactive media monitoring application may dynamically filter this inconsistent content and remove or replace the content with content related to one or more already watched episodes (or, in some embodiments, the next episode to be watched). As another example, a VOD program about to be presented on the user equipment may include advertising relating to an unwatched episode of "24." The interactive media monitoring application may analyze episode data contained in media profile flags associated with the advertising content and remove the advertising relating to the unwatched episode and/or replace the advertising with advertisements or other content relating to an already watched episode of "24." The interactive media monitoring application may also compare the user's media profile data with profile flags associated with the inconsistent content to be replaced and/or the content replacing the inconsistent media content. The user may also select the default "All Media" option in filter content choice 1312 to instruct the media monitoring application to filter all supported media types (e.g., web, broadcast, and VOD content). To disable filtering of media content, the user may select "None" in filter content choice 1312.

Several filter actions may be defined in action choice 1314 in accordance with one embodiment of the invention. The default filter action is "Follow Me." This action substitutes inconsistent media with media content relevant to the user's current viewing progress (as defined in the user's media profile). For example, if a user has watched through season 3, episode 4 of "Nip/Tuck" on the FX network, the interactive media monitoring application may substitute advertisements, news segments, and other media content associated with the series with media content directed toward the next unwatched episode in the series (i.e., season 3, episode 5). Specifically, the advertisements, news segments, and other media content that may be replaced may relate to any unwatched episode beyond or after the user's next unwatched episode (i.e., season 3, episode 6 and beyond).

In other embodiments, the interactive media monitoring application simply blanks, or removes, inconsistent media content when it is encountered. The interactive media monitoring application may compare profile flags associated with media content about to be presented on the user equipment with the user's media profile data. If inconsistent media is located, the interactive media monitoring application may remove this content and/or prevent the content from being resented on the user equipment. This prevents the user from watching spoilers or other content, which may reveal content from episodes that the user has not yet viewed. Another option in action choice 1314 is to replace inconsistent media content with a fixed graphic or video. For example, upon selecting "Replace" in action choice 1314, the user may be presented with an overlay or display to specify a local graphic, video, or other media content. The interactive media monitoring application may replace inconsistent content about to be displayed on the user equipment with this local content whenever inconsistent content is encountered.

If the user wishes the filter to take no action, then the user may select "None" in action choice 1314. To save the settings as displayed in global settings screen 1300, the user may select save button 1316. To discard global settings screen 1300 without saving, the user may select cancel button 1318.

Figure 14:
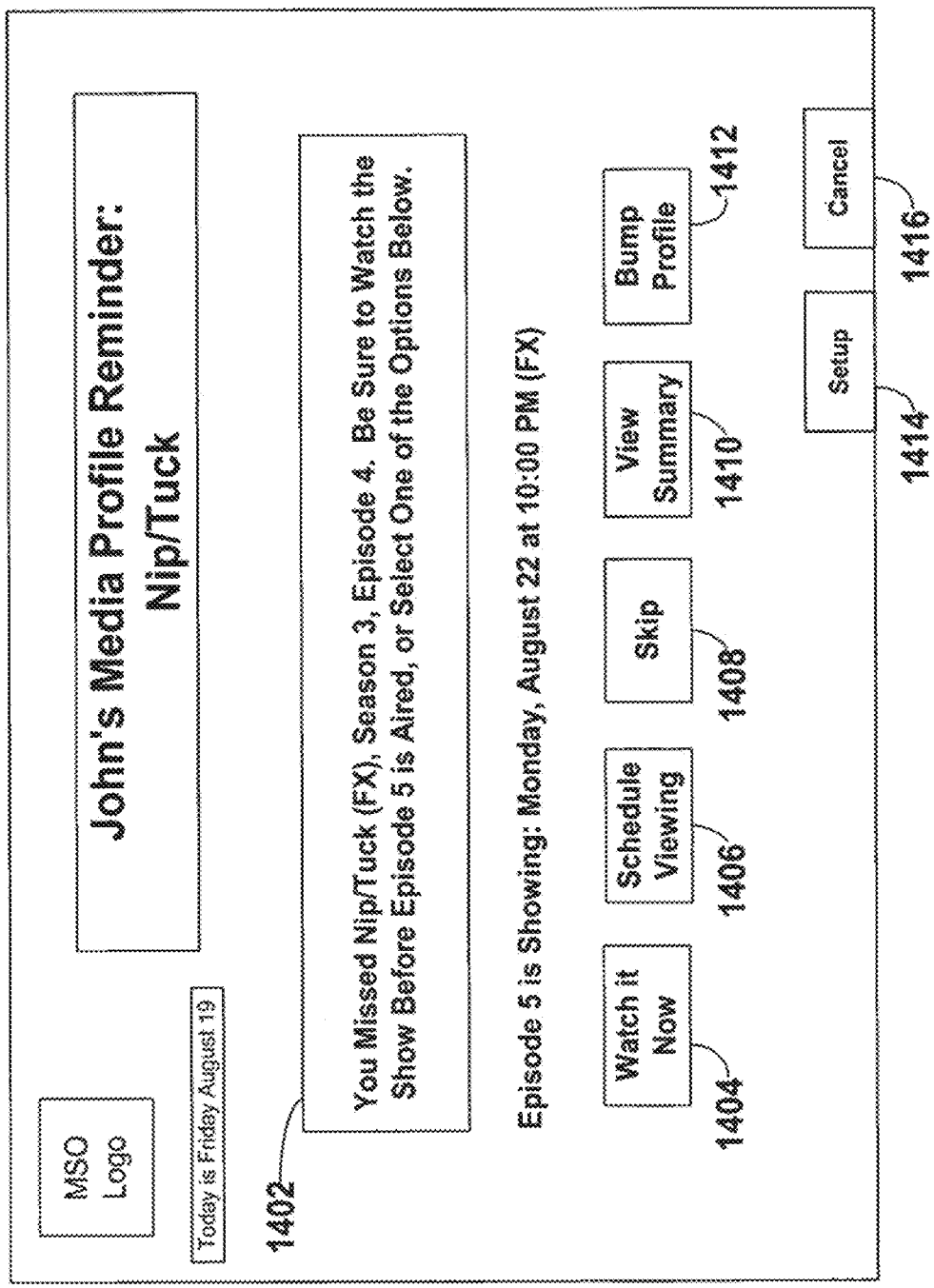
FIG. 14 is an illustrative display of a user reminder screen in accordance with one embodiment of the invention.

FIG. 14 shows an illustrative user reminder display screen 1400 in accordance with one embodiment of the invention. The interactive media monitoring application may remind a user of upcoming or missed episodes in a user's media profile at various times. For example, reminder screen 1400 may be presented to a user after log-in via log-in screen 1000 (FIG. 10) as an overlay on log-in screen 1000, after a new episode of a series included in the user's media profile has been broadcast, or after a system (or custom) reminder frequency has elapsed. In one embodiment, the interactive media monitoring application presents reminder screen on a custom reminder schedule, as defined via the "Custom" option of frequency choice 1308 of settings screen 1300 (FIG. 13).

Reminder screen 1400 may include information box 1402, which alerts the user to some media profile reminder. In the example of FIG. 14, information box 1402 informs the user that another episode in the series "Nip/Tuck" is going to be aired on Monday. The interactive media monitoring application may use schedule information derived from interactive program guide data to determine when the next program in a series is to be broadcast. Information box 1402 informs the user that he or she may wish to watch any missed episodes before the next episode is to be broadcast. For example, if the user has not watched episodes 2 or 3 of the series "Nip/Tuck," reminder screen 1400 may remind the user to watch both episodes before episode 4 is broadcast.

Media profile reminders may be displayed in several different forms depending on the particular platform involved. For example, if the interactive media monitoring application is running on a computer platform or Internet media terminal, media profile reminders may be presented as Internet pop-up windows or system dialog boxes. Other suitable forms of media profile reminders include, for example, email messages, SMS/EMS/MMS messages, television overlays. Reminders may also be delivered to remote user devices, such as pagers and telephones that are not running the interactive media monitoring application.

In addition, the user may take several pre-defined actions in response to a reminder. For example, the user may watch the missed episode by selecting watch button 1404. Upon selecting watch button 1404, the user equipment may contact distribution facility 104 (FIG. 1) to present the user with any unwatched episodes in the series using VOD services. If the user watches one or more unwatched episodes, the user's media profile is automatically updated accordingly. The user may also schedule the missed episode for automatic presentation on the user equipment at a later date and time by selecting schedule button 1406. For example, the user may schedule the missed episode for automatic presentation 30 minutes after display of the reminder. To advance the user's media profile without watching the missed episode, the user may select skip button 1408. To view a summary or synopsis of the missed episode, the user may select summary button 1410. Upon selecting summary button 1410, the user may be presented with a text, graphic, or video summary of the missed episode. The type of summary presented to the user may depend on the summary type option selected in type choice 1310 of settings screen 1300 (FIG. 13). To bump or delay a user's viewing schedule by one or more episodes without watching the episode, the user may select bump button 1412. If a user's schedule is bumped, profile reminders may be delayed by one or more program periods. For example, if a user bumps a missed episode that is broadcast weekly, profile reminders may be scheduled for display on a schedule delayed by one week. The user may then watch the series of programs one week behind the program's broadcast schedule. If a user is behind by more than one episode, the user may be provided with a list of unwatched episodes. The user may then select to watch one or more of the episodes, schedule one or more of the episodes for viewing at a later time, or view a content summary of one or more of the episodes. Actions 1404, 1406, 1408, 1410, and 1412 are merely exemplary, and other actions may be provided. For example, reminder screen 1400 may include selections for any other action capable of being carried out by the media monitoring application or another interactive media application running on the user equipment. To configure media profile reminders, the user may select setup button 1414. In some embodiments, selecting setup button 1414 presents the user with settings screen 1300 (FIG. 13). To discard reminder screen 1400 without taking any action, the user may select cancel selection 1416.

In some embodiments, the interactive media monitoring application allows a user to prioritize content within a user's media profile. The shows listed in reminder display screen 1400 may be displayed in order of priority determined by interactive media monitoring application based on a user's media profile. For example, a user may prefer being more current with the series "24" than the series "Nip/Tuck." In this example, a user may configure the series "24" to have a higher priority than the series "Nip/Tuck" in the user's media profile. In some embodiments, the interactive media monitoring application may remind the user to watch higher priority programs more often than lower priority programs. This may be desirable for a particular user because this user's co-workers and/or friends may watch "24" and not "Nip/Tuck" and may discuss the content of "24" in front of the user on a regular basis.

In some embodiments, a user may create a personalized schedule of programming for different series of programs. For example, using bump button 1412 a user may create a viewing schedule such that the viewing schedule is in order, but one week (or some other predetermined amount of time) behind the schedule for when the episode of the program is broadcast or otherwise made available to the user equipment. For example, a user may wish to watch the series "24" one day (or one week) after the scheduled broadcast each week. The interactive media monitoring application may delay viewing reminders based on this custom viewing schedule (e.g., reminders may be presented at the time the program is broadcast or released one week behind schedule or at any other desired time).

Figure 15:
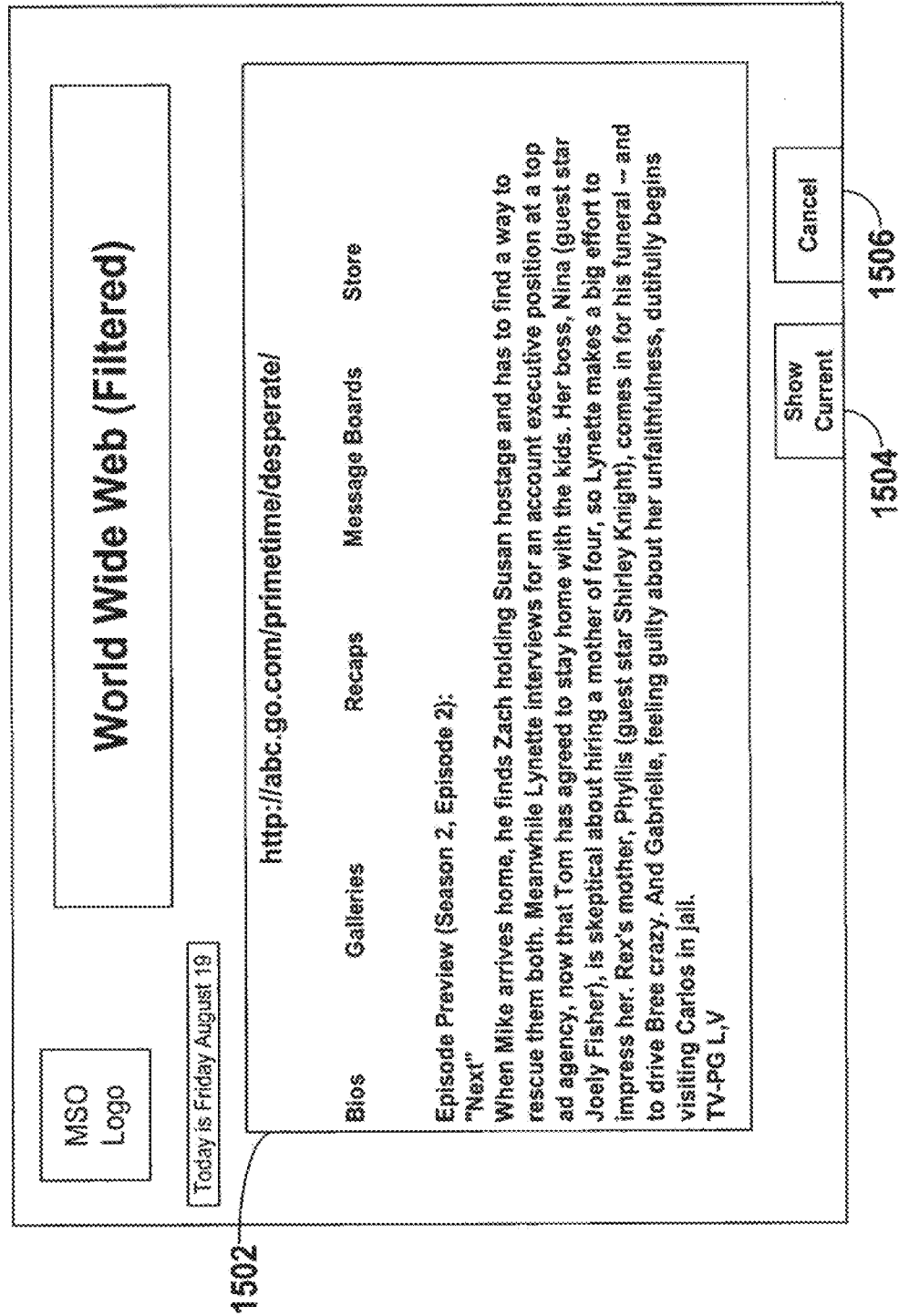
FIG. 15 is an illustrative display of a filtered web content screen in accordance with one embodiment of the invention.

FIG. 15 shows illustrative filtered web content screen 1500 in accordance with one embodiment of the invention. The interactive media monitoring application may replace or remove any media content that is inconsistent with a user's media profile. For example, in some embodiments the interactive media monitoring application replaces advertising provided in a web page, which is typically received from one content or data source, with substitute advertising received from another content or data source. The substitute advertising data may be correlated with the user's viewing progress (as defined by the user's media profile) so that irrelevant or inconsistent advertising is replaced with the substitute advertising. For example, profile flags (such as profile flags 800 and 810 of FIGS. 8A and 8B) may be associated with web content objects. The interactive media monitoring application may receive these profile flags before the web page is presented on the user equipment and compare the profile flag data to data associated with the user's media profile. If any inconsistent content is encountered, the interactive media monitoring application may remove or replace the inconsistent content with content consistent with the user's media profile.

A user's media profile may also be made available to external sources, such as content distributors, search engines, and discussion forms. In some embodiments, the interactive media monitoring application may deliver data associated with a user's media profile to authorized, requesting external sources. In other embodiments, external sources may access media profiles stored on a shared network location (e.g., an Internet server). The external sources may then provide content to the user that is consistent with the user's media profile.

For example, a user, who is searching for webpages using an external search engine, may be presented with custom search results. The custom search results may be tailored to the user's current progress in one or more programs being monitored by the interactive media monitoring application. For example, search results that link to content containing spoilers or other undesirable content relating to unwatched episodes may be removed from the user's search results display page. As another example, a user visiting an external discussion forum may only be presented with postings relating to media content that the user has already watched. The discussion forum may access data stored in the user's media profile to determine the user's current progress in one or more programs being monitored by the interactive media monitoring application and present content to the user accordingly. In some embodiments, the user may be given the opportunity to choose whether to be presented with content relating to unwatched episodes in the user's media profile.

Others types of media may also be filtered by the interactive media monitoring application. Filtered web content page 1500 includes filtered web content object 1502, which, in the example of FIG. 15, is a web page object, but could include any network resource or Internet object. Upon accessing supported websites, the interactive media monitoring application may send a token to the web server in advance of retrieving a web content object. The web server may parse the token and, based on parsed data in the token, return custom or filtered data to the requesting client, including tailored text (including article headlines), advertising, graphics, images, video, etc. Complete custom webpages may also be delivered to the requesting user, if desired. In the example of FIG. 15, filtered web content object 1502 is a web page relating to the user's next unwatched episode of "Desperate Housewives" (e.g., season 2, episode 2). Token data, which in some embodiments is cookie data, may be used to determine the user's current viewing progress on the user equipment. The token data may include data representative of the user's actual viewing progress (e.g., the season number and/or episode number or any other unique episode identifier of a program series) or may include data representative of the user accessing the website or network resource. If the token data includes information relating to the user accessing the website or network resource, the web server may access media profile information from a network or third-party location and then use this information to deliver custom content to the user equipment.

If the user wishes to view the current, generic version of the webpage or network resource, the user may select show current button 1504. Upon selecting show current button 1504, the public version of filtered web content object 1502 is presented to the user. To discard web content page 1500, the user may select cancel button 1506.

The user may access filtered web content (as well as any other media content) on any form of suitable user equipment. In some embodiments, the user equipment may be outside media system 100. For example, a user, who is accessing media content from a PDA, cellular telephone, or office computer or television, may also be provided with filtered content. These devices may access publicly accessible media profile data stored on a network storage device and use this profile data to request filtered content. In some embodiments, a client version of the media monitoring application may be installed on the devices outside media system 100. The client media monitoring application may access the media profile data and provide substantially the same monitoring and filtering capabilities as the interactive media monitoring application resident within media system 100. In this way, a user, who is accessing the Internet at work using his work computer, may still access the user's media profile and receive filtered web content objects as if the user was at his home user equipment.

Figure 16:
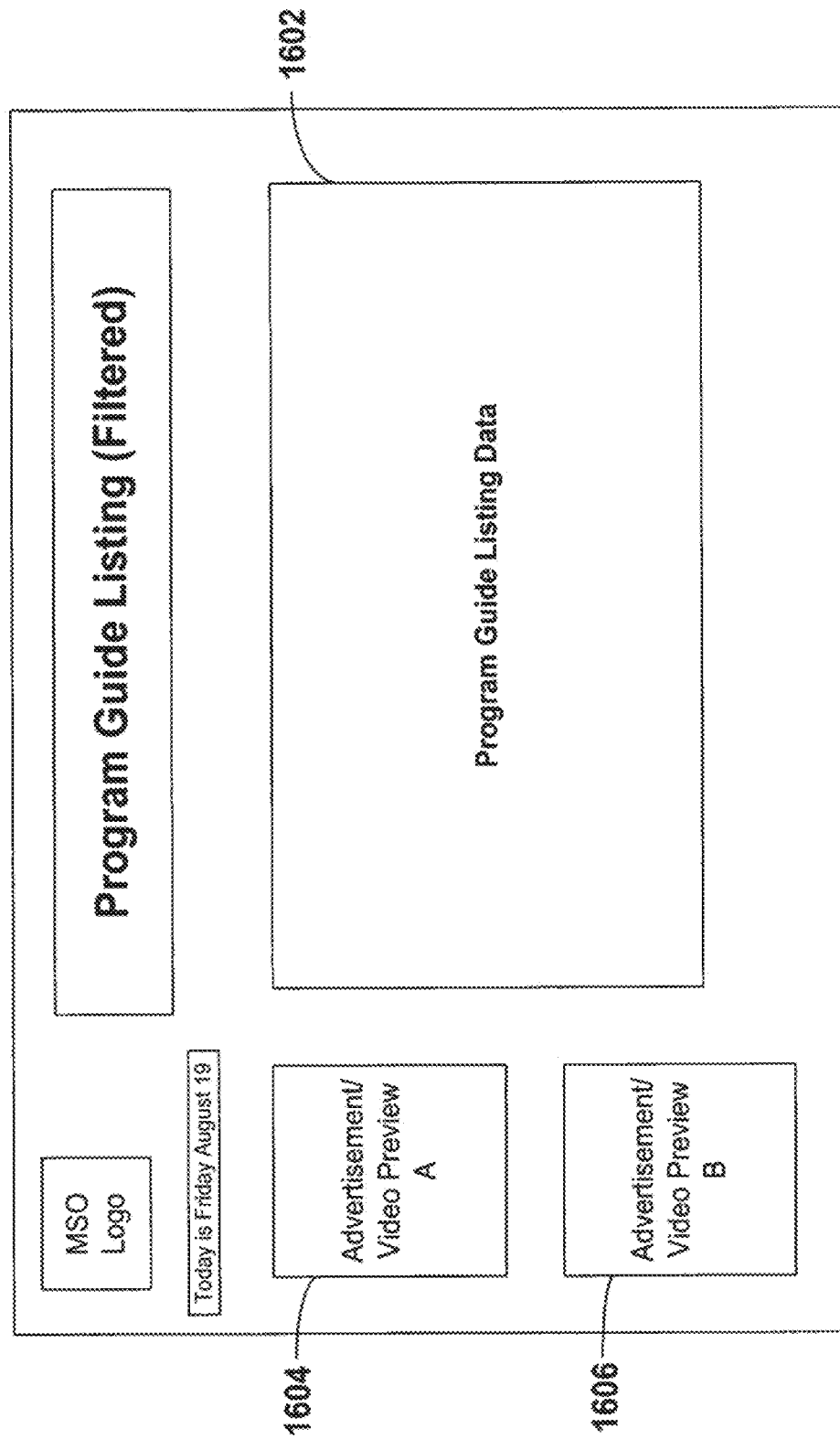
FIG. 16 is an illustrative display of an interactive program guide listing screen in accordance with one embodiment of the invention.

FIG. 16 shows illustrative interactive program guide listing screen 1600 in accordance with one embodiment of the invention. Interactive program guide listing screen 1600 may include listing data area 1602, advertisement/preview panel 1604, and advertisement/preview panel 1606. In one embodiment, the media content presented in preview panels 1604 and 1606 is accessed from an advertising content or data source, such as data source 120 or programming sources 102 (FIG. 1). Additionally or alternatively, the content in preview panels 1604 and 1606 may be connected to any user selections in listing data area 1602. For example, as a user scrolls through listings in listing data area 1602, the media presented in preview panels 1604 and 1606 may change. The interactive media monitoring application may replace or filter advertising and/or video previews presented in preview panels 1604 and 1606 in a number of ways. In one embodiment, advertising or previews inconsistent with a user's media profile are removed. In other embodiments, the interactive media monitoring application obtains media content for preview panels 1604 and 1606 from a substitute content or data source (e.g., substitute content/data source 902 of FIG. 9). The interactive media monitoring application may similarly replace full screen advertisements and previews, such as television broadcast advertisements, that are presented on the user equipment. As described above, full screen advertisements and previews that are inconsistent with a user's media profile may be removed or replaced with media content from a substitute data source or fixed content.

This substitute content or data source may be filtered so as to be consistent with a user's current viewing progress. For example, advertisements for the next unwatched episode of "Desperate Housewives" may be included in the substitute content or data source. The interactive media monitoring application may compare the user's current viewing progress in media profile record 710 (FIG. 7) with profile flags associated with the suitable substitute content (e.g., profile flags 800 and/or 810 of FIGS. 8A and 8B). Content relating to the next unwatched episode (or watched episodes) in the program series may be added to the substitute content or data source. Content in the substitute content or data source may then be presented in preview panels 1604 or 1606. Alternatively or additionally, when a user selects the program listing in listing data area 1602 corresponding to a series in the user's media profile, media content may be accessed and displayed in preview panels 1604 or 1606 based on the user's viewing progress in that series. For example, if a user selects the program listing for "Nip/Tuck" from listing data area 1602, an advertisement for the user's next unwatched episode of "Nip/Tuck" may be presented to the user in preview panels 1604 or 1606.

Figure 17:
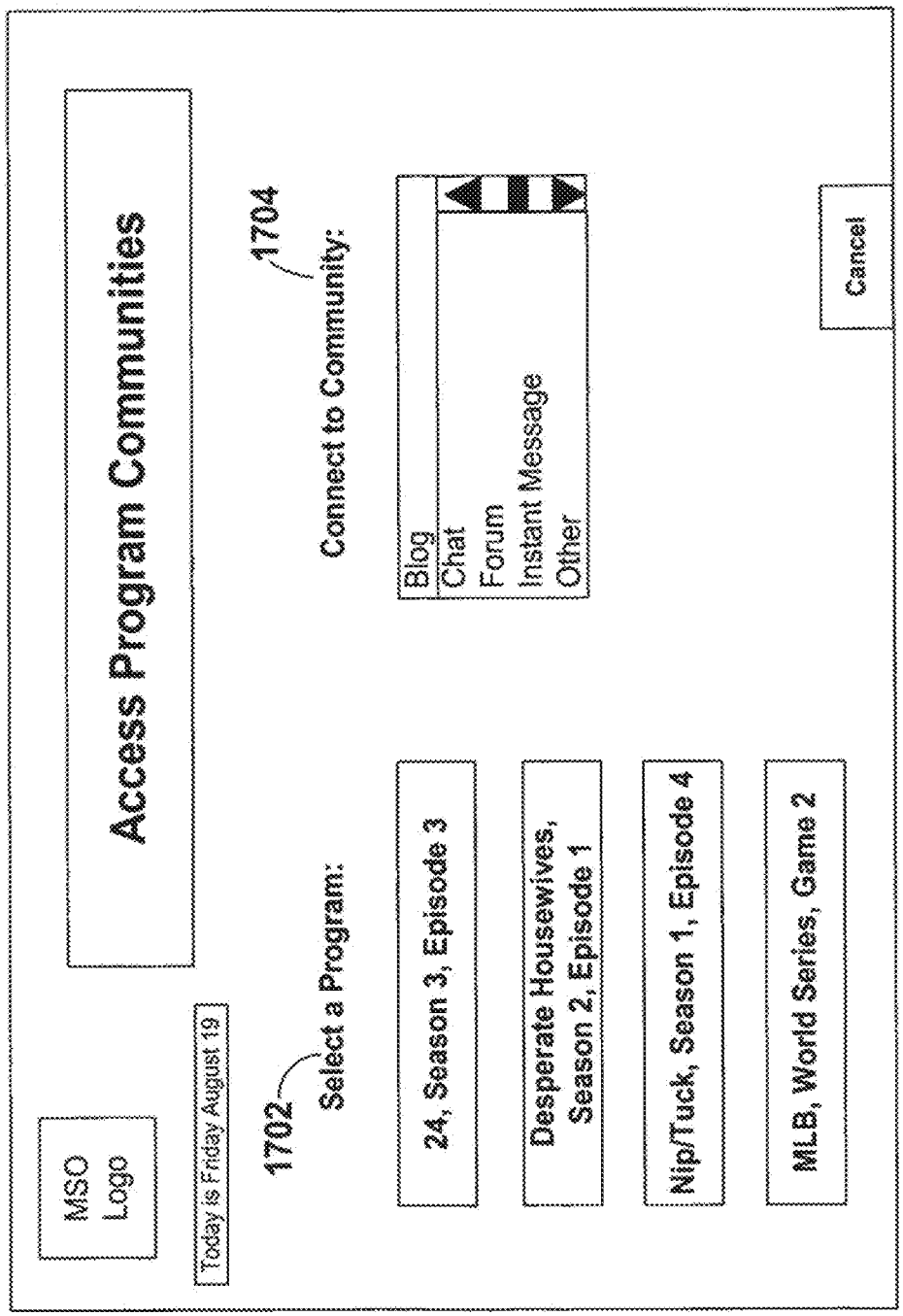
FIG. 17 is an illustrative display of a user network communities screen in accordance with one embodiment of the invention.

FIG. 17 shows illustrative user network communities display screen 1700 in accordance with one embodiment of the invention. A user may be automatically connected to event communities associated with content recently watched by the user. These event communities may be available on the public Internet or the communities may be accessed via a private media network, such as communication network 126 (FIG. 1). User network communities screen 1700 presents the user with media content in the user's media profile in program column 1702. Along with the media content name, the user's current season and episode number (if applicable) may also be displayed in program column 1702. A user may select any content listed in program column 1702 and be connected to any community type listed in community type choice 1704. For example, communities may include any network-based forum capable of exchanging messages between a number of users, such as web logs (blogs), chat rooms, newsgroups, and discussion forums. Some of these forums may be real-time forums, such as chat rooms and instant messaging forums. For example, a user, who has just watched Game 2 of the World Series, may be connected to a chat room with other users, who have also just watched Game 2 of the World Series or a blog with information relating to Game 2 of the World Series. The interactive media monitoring application may compare progress data stored in media profile record 710 with data associated with available forums and control the membership of the forum or community as new users request access to the forum or community. The users in the forum may converse in real-time about the content they have just watched or any other topic. In one embodiment, the user's instant messaging service is automatically invoked after selecting "Instant Message" from community type choice 1704. An associated messaging service is then launched with a "buddy list" of other users connected to the instant message community for the associated content in program column 1702. In this way, the user's buddy list may reflect only users that have recently watched a particular program, such as Game 2 of the World Series.

Figure 18:
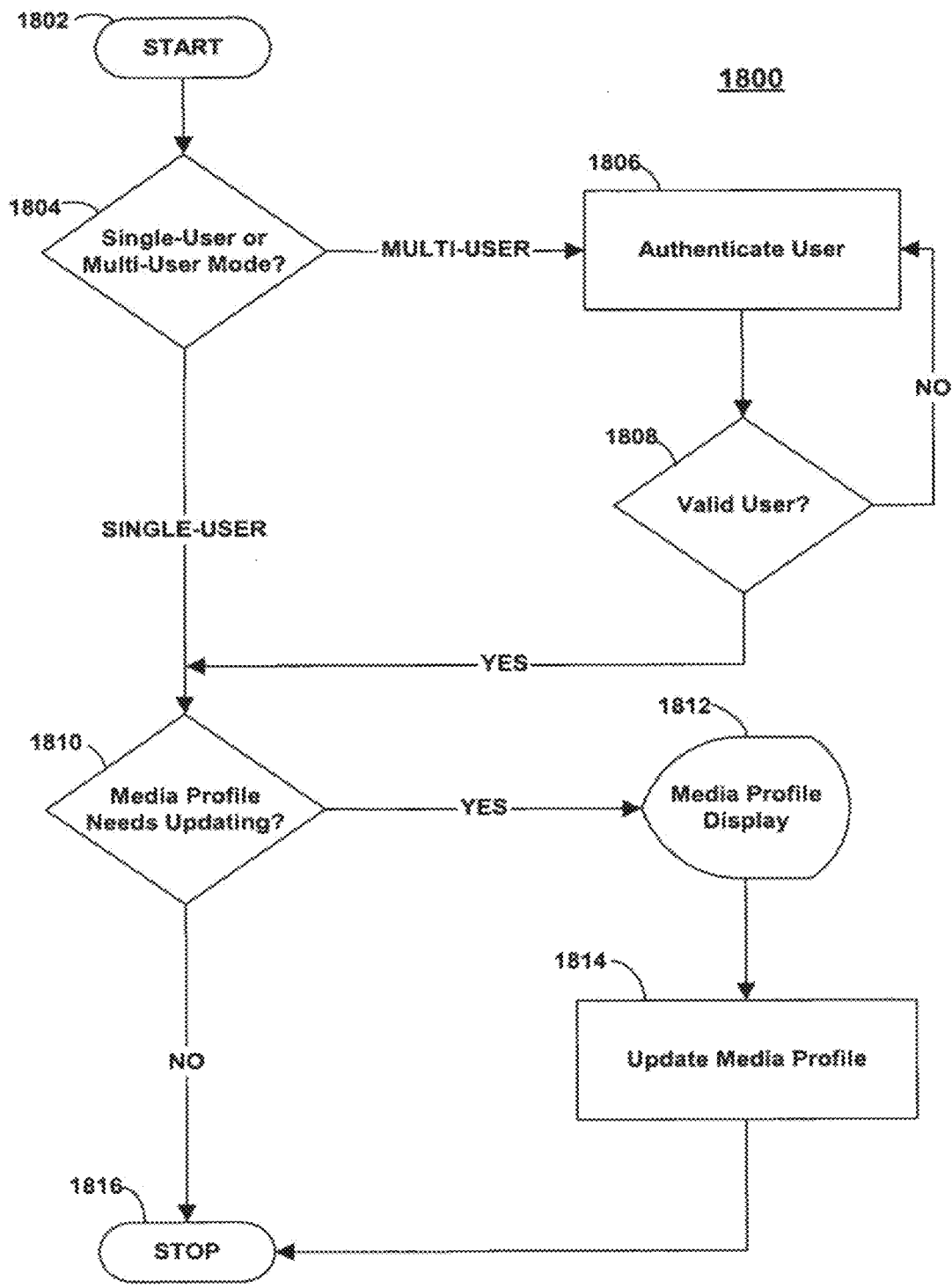
FIG. 18 is a flow chart of an illustrative process for accessing and initializing the media monitoring application in accordance with one embodiment of the invention.

FIG. 18 is a flowchart of illustrative process 1800 for accessing and initializing the interactive media monitoring application in accordance with one embodiment of the invention. Upon attempting to access the interactive media monitoring application (e.g., via pressing a key on a user input device or being presented with log-in screen 1000 (FIG. 10)), the user may arrive at start step 1802. The interactive media monitoring application may determine at decision 1804 whether the application is configured for single-user or multi-user mode. The mode option may be derived from user mode selection 1306 of settings screen 1300 (FIG. 13). If the interactive media monitoring application determines at decision 1804 that the application is running in multi-user mode, the user may be authenticated at step 1806. Step 1806 may correspond to the submission of a log-in or authentication screen (such as log-in screen 1000 of FIG. 10). At decision 1808, the interactive media monitoring application may determine if the user is valid. If the user is valid, the interactive media monitoring application may then decide if the user's media profile needs to be updated at decision 1810. If the user is not validated at decision 1808, the interactive media monitoring application may try to authenticate the user again at step 1806.

If the application is running in single-user mode, or if a valid user has been detected at decision 1808, the interactive media monitoring application may determine if the current user's media profile needs to be updated at decision 1810. At this point, the interactive media monitoring application may determine if the user has missed any episodes of programs contained in the user's media profile. If a positive determination is made at decision 1810, the interactive media monitoring application may display the user's current viewing progress based on the user's media profile at display 1812. Based on any received user input, the application may then update the user's media profile at step 1814. Updating a user's profile may require network access in some embodiments, particularly if the profile is a roaming profile. After the user's profile is updated, or if a negative determination is made at decision 1810, the illustrative process may stop at step 1816.

In practice, one or more steps shown in process 1800 may be combined with other steps, performed in any suitable order, performed in parallel—e.g., simultaneously or substantially simultaneously—or deleted.

Figure 19:
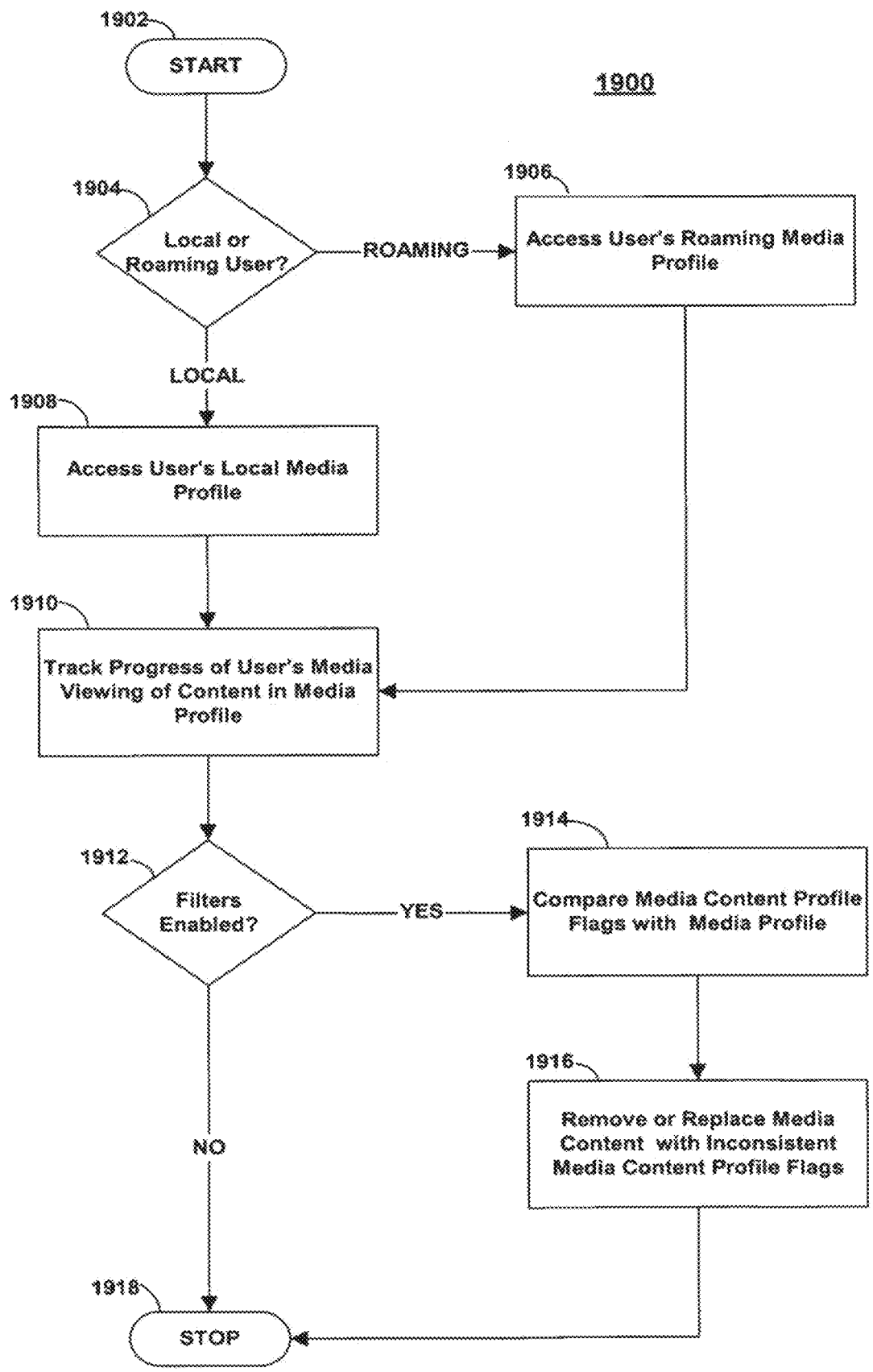
FIG. 19 is a flow chart of an illustrative process for filtering media content in accordance with one embodiment of the invention.

FIG. 19 is a flow chart of illustrative process 1900 for filtering media content in accordance with one embodiment of the invention. The process starts at step 1902. This step may correspond to enabling media profiles via settings screen 1300 (FIG. 13). At decision 1904, the interactive media monitoring application may determine if the current user has a local or roaming profile. This determination may be made from profile type choice 1304 (FIG. 13). If the interactive media monitoring application determines that the user is associated with a roaming profile, the user's profile may be accessed at step 1906. In some embodiments, the interactive media monitoring application may read the user's roaming profile into memory. In other embodiments, the interactive media monitoring application may download the profile from a remote location. Version controls and concurrency measures may be implemented by the interactive media monitoring application if the profile is to be accessed at the same time by more than one interactive media application.

If the interactive media monitoring application determines at decision 1904 that the user is associated with a local profile, the user's local profile may be accessed at step 1908. After the appropriate profile has been accessed, the interactive media monitoring application may track the user's viewing progress of content included in the profile at step 1910. For example, as a user completes an episode of a season of "24," the user's media profile may be automatically updated to reflect this event. Interrupted or incomplete viewings of an episode may be treated as unwatched episodes in some embodiments. In other embodiments, an incomplete or interrupted viewing may cause the interactive media monitoring application to save state data about the user's viewing progress to the user's media profile (e.g., the interactive media monitoring application may save the user's time position within the episode). The user may then access the user's media profile and start the episode at the point the user was interrupted. In some embodiments, the interactive media monitoring application may also consider the user's time position within a program when substituting content inconsistent with a user's media profile. For example, if the user has not yet watched a player in Game 2 of the World Series hit a grand slam homerun, the interactive media monitoring application may filter content that refers to, or is associated with, this event. The interactive media monitoring application may analyze position and progress data in media profile record 710 to determine the user's position within an episode. The application may then compare this data to media profile flag data, such as the data contained in tags 804 and 814 of profile flags 800 (FIG. 8A) and 810 (FIG. 8B), respectively, to determine what content is consistent with the user's current viewing progress.

At decision 1912, the interactive media monitoring application may determine if filters are enabled. This setting may correspond to filter choice 1312 of FIG. 13. If filters are enabled, the interactive media monitoring application may associate substitute content or data source 902 (FIG. 9) with the user's viewing environment. The interactive media monitoring application may compare profile flags associated with media content to be displayed on the user equipment with the user's media profile at step 1914. For example, media flags 800 and 810 of FIGS. 8A and 8B may be compared with media profile record 710 of FIG. 7B. The interactive media monitoring application may then remove or replace media content associated with profile flags that are inconsistent with the user's media profile at step 1916. The interactive media monitoring application may also create a substitute content or data source containing replacement media content associated with profile flags that are consistent with the user's media profile. In other embodiments, a dynamic filter may screen media content profile flags before content is presented on the user equipment. Any content that is associated with future or unwatched programs in the user's media profile (except in some embodiments the next unwatched program) may be automatically removed or replaced, depending on the user's preferences. In some embodiments, the interactive media monitoring application presents a display screen, overlay, or dialog warning the user of inconsistent media content about to be displayed on the user equipment. The user may then select to view the inconsistent content, skip or fast-forward through the inconsistent content, freeze the presentation of the media content, or any other suitable action. At step 1918, the illustrative process may stop.

In practice, one or more steps shown in process 1900 may be combined with other steps, performed in any suitable order, performed in parallel—e.g., simultaneously or substantially simultaneously—or deleted. For example, step 1910 of tracking a user's viewing progress may be performed while filtering media content at step 1914. In another embodiment, decision 1912 and step 1914 are removed completely (e.g., when filters are globally disabled via settings screen 1300).

Figure 20:
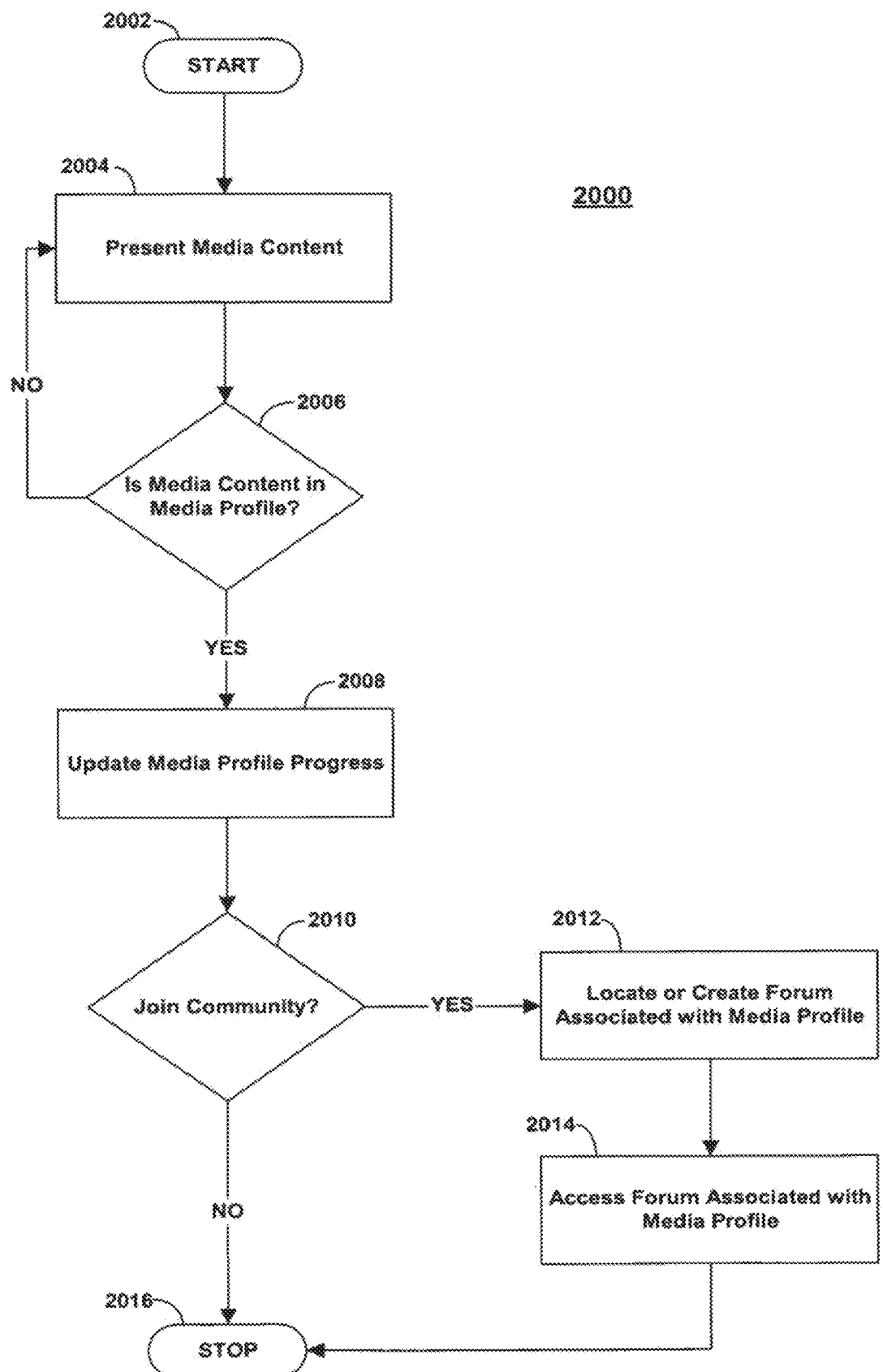
FIG. 20 is a flow chart of an illustrative process for tracking media viewing progress and accessing network communities in accordance with one embodiment of the invention.

FIG. 20 is a flow chart of illustrative process 2000 for tracking media viewing progress and accessing network communities in accordance with one embodiment of the invention. The process begins at step 2002. This step may correspond to accessing the interactive media monitoring application or enabling a user's media profile. At step 2004, the user may be presented with some media content on the user equipment. The interactive media monitoring application may determine at decision 2006 if the media content recently or currently being presented to the user is in the user's media profile. If the content is in the user's media profile, the user's viewing progress is updated at step 2008. The user's progress within a season or progress within an episode may be updated. The user may then be given the opportunity to access a program community. At decision 2010, the interactive media monitoring application may determine if a request has been made to join a program community. If the interactive media monitoring application determines that a request has been made to join a program community, the interactive media monitoring application may locate or create a community forum associated with the user's media profile at step 2012. For example, in one embodiment the Internet is accessed to locate a suitable chat room. At step 2014, the interactive media monitoring application may access the forum located or created at step 2012. If the user is the first member of the community forum, a new community forum may be created. Otherwise, the current user is added to the forum membership list. If the user does not wish to join a program community or after the interactive media monitoring application has accessed the community forum at step 2014, the illustrative process stops at step 2014.

In practice, one or more steps shown in process 2000 may be combined with other steps, performed in any suitable order, performed in parallel—e.g., simultaneously or substantially simultaneously—or deleted. For example, if the user equipment is not Internet or network-enabled, decision 2010 and step 2012 of accessing a program community may be eliminated.

One skilled in the art will appreciate that the invention can be practiced by other than the prescribed embodiments, which are presented for purposes of illustration and not of limitation, and the invention is limited only by the claims which follow.

What is claimed is:
1. A method comprising:
   creating, using control circuitry, a media profile comprising a viewing progress within a serial program, wherein the serial program comprises a plurality of episodes;
   storing the media profile in a storage device;
   determining, using the control circuitry, a progress point in the serial program based on the viewing progress;

identifying first supplemental media content that is associated with the media profile;

determining the first supplemental media content is inconsistent with the progress point;

in response to determining the first supplemental media content is inconsistent with the progress point, identifying second supplemental content that is related to a previously watched program;

receiving a user selection of the serial program; and in response to receiving the user selection, generating for display the serial program at the progress point and the second supplemental content.

2. The method of claim 1, further comprising generating for display a viewing option that comprises presenting a menu including the viewing option.

3. The method of claim 2, wherein the progress point corresponds to an episode of the plurality of episodes, and wherein the menu further includes a summary of a subsequent episode in relation to the episode of the plurality of episodes.

4. The method of claim 2, wherein the progress point corresponds to an episode of the plurality of episodes, and wherein the menu further includes a title of a subsequent episode in relation to the episode of the plurality of episodes.

5. The method of claim 2, wherein the menu is of comprises indications of recently watched programs.

6. The method of claim 2, wherein selecting the serial program causes a second option to be provided, wherein the second option is for generating for display the serial program at the beginning of an episode of the plurality of episodes.

7. The method of claim 1, wherein determining the progress point in the serial program based on the viewing progress comprises analyzing metadata associated with the serial program.

8. The method of claim 7, wherein the metadata associated with the serial program indicates an episode, of the plurality of episodes, that should be presented to a user associated with the user selection before or after a current episode of the plurality of episodes.

9. The method of claim 1, further comprising updating the viewing progress in the media profile to indicate a current episode of the plurality of episodes has been viewed.

10. The method of claim 9, further comprising selecting an advertisement to deliver to a user associated with the user selection based on the updated media profile.

11. The method of claim 1, wherein determining the first supplemental media content is inconsistent with the progress point comprises determining that the first supplemental media content depicts one or more portions of a particular episode of the plurality of episodes of the serial program and that the viewing progress indicates that the particular episode has not yet been watched.

12. A system comprising:
a storage device; and
control circuitry configured to:
create a media profile comprising a viewing progress within a serial program, wherein the serial program comprises a plurality of episodes;
store the media profile in the storage device;
determine a progress point in the serial program based on the viewing progress;
identify first supplemental media content that is associated with the media profile;
determine the first supplemental media content is inconsistent with the progress point;
in response to determining the first supplemental media content is inconsistent with the progress point, identify second supplemental content that is related to a previously watched program;
receive a user selection of the serial program; and
in response to receiving the user selection, generate for display the serial program at the progress point and the second supplemental content.

13. The system of claim 12, wherein the control circuitry is further configured to generate for display a viewing option that comprises presenting a menu including the viewing option.

14. The system of claim 13, the progress point corresponds to an episode of the plurality of episodes, and wherein the control circuitry configured to present the menu is further configured to include a summary of a subsequent episode in relation to the episode of the plurality of episodes.

15. The system of claim 13, the progress point corresponds to an episode of the plurality of episodes, and wherein the control circuitry configured to present the menu is further configured to include a title of a subsequent episode in relation to the episode of the plurality of episodes.

16. The system of claim 13, wherein the control circuitry configured to present the menu is further configured to comprise indications of recently watched programs in the menu.

17. The system of claim 13, wherein the control circuitry if further configured to receive a selection of the serial program which causes a second option to be provided, wherein the second option is for generating for display the serial program at the beginning of an episode of the plurality of episodes.

18. The system of claim 12, wherein the control circuitry is configured to determine the progress point in the serial program based on the viewing progress by analyzing metadata associated with the serial program.

19. The system of claim 18, wherein the control circuitry is further configured to analyze the metadata associated with the serial program that indicates an episode, of the plurality of episodes, that should be presented to a user associated with the user selection before or after a current episode of the plurality of episodes.

20. The system of claim 12, wherein the control circuitry is further configured to update the viewing progress in the media profile to indicate a current episode of the plurality of episodes, has been viewed.

* * * * *

UNITED STATES PATENT AND TRADEMARK OFFICE
CERTIFICATE OF CORRECTION

PATENT NO. : 12,382,131 B2
APPLICATION NO. : 17/144466
DATED : August 5, 2025
INVENTOR(S) : Charles Cordray et al.

It is certified that error appears in the above-identified patent and that said Letters Patent is hereby corrected as shown below:

In the Claims

Claim 5, Column 37, Line 28, delete "is of"

Signed and Sealed this
Ninth Day of September, 2025

Coke Morgan Stewart
*Acting Director of the United States Patent and Trademark Office*